United States Patent [19]

Lee et al.

[11] Patent Number: 4,903,299

[45] Date of Patent: Feb. 20, 1990

[54] ID PROTECTED MEMORY WITH A MASKABLE ID TEMPLATE

[75] Inventors: Robert D. Lee, Denton; Hal Kurkowski, Dallas, both of Tex.

[73] Assignee: Dallas Semiconductor Corporation, Dallas, Tex.

[21] Appl. No.: 212,500

[22] Filed: Jun. 28, 1988

[51] Int. Cl.$^4$ .............................................. H04L 9/00
[52] U.S. Cl. .......................................... 380/25; 380/4; 380/6
[58] Field of Search ...................... 380/4, 6, 8, 23, 25, 380/49

[56] References Cited

U.S. PATENT DOCUMENTS

| | | | |
|---|---|---|---|
| 4,278,837 | 7/1981 | Best | 380/49 |
| 4,433,207 | 2/1984 | Best | 380/25 |
| 4,465,901 | 8/1984 | Best | 380/25 |
| 4,757,533 | 7/1988 | Allen et al. | 380/25 |
| 4,797,928 | 1/1989 | Pykes | 380/25 |
| 4,799,153 | 11/1989 | Hann et al. | 380/25 |

Primary Examiner—Salvatore Cangialosi
Attorney, Agent, or Firm—Worsham, Forsythe, Sampels & Wooldridge

[57] ABSTRACT

A remotely disposed RAM (12) is provided which is accessible by a centralized serial CPU (28) through a common data link. The Ram (12l) is interfaced with the common data link through a serial port (19) and access thereto is controlled by an arbiter (10). The arbiter (10) includes a protocol shift register (31) for receiving control information, ID information and address information for the RAM (12). The ID information is compared with prestored identification information in an ID template (37). This ID template is operable to have a portion thereof masked off in response to receiving a mask command as part of the control information. If a match is present between the unmasked portion of the ID template and the corresponding portion of the ID information, access is allowed to the arbiter (10) and the RAM (12). A response is then transmitted to the common data link in the form of data read from the RAM.

17 Claims, 10 Drawing Sheets

FIG. 9

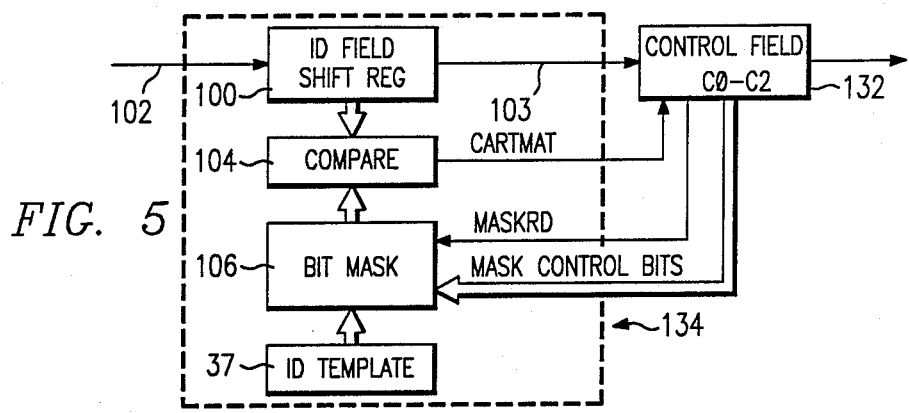
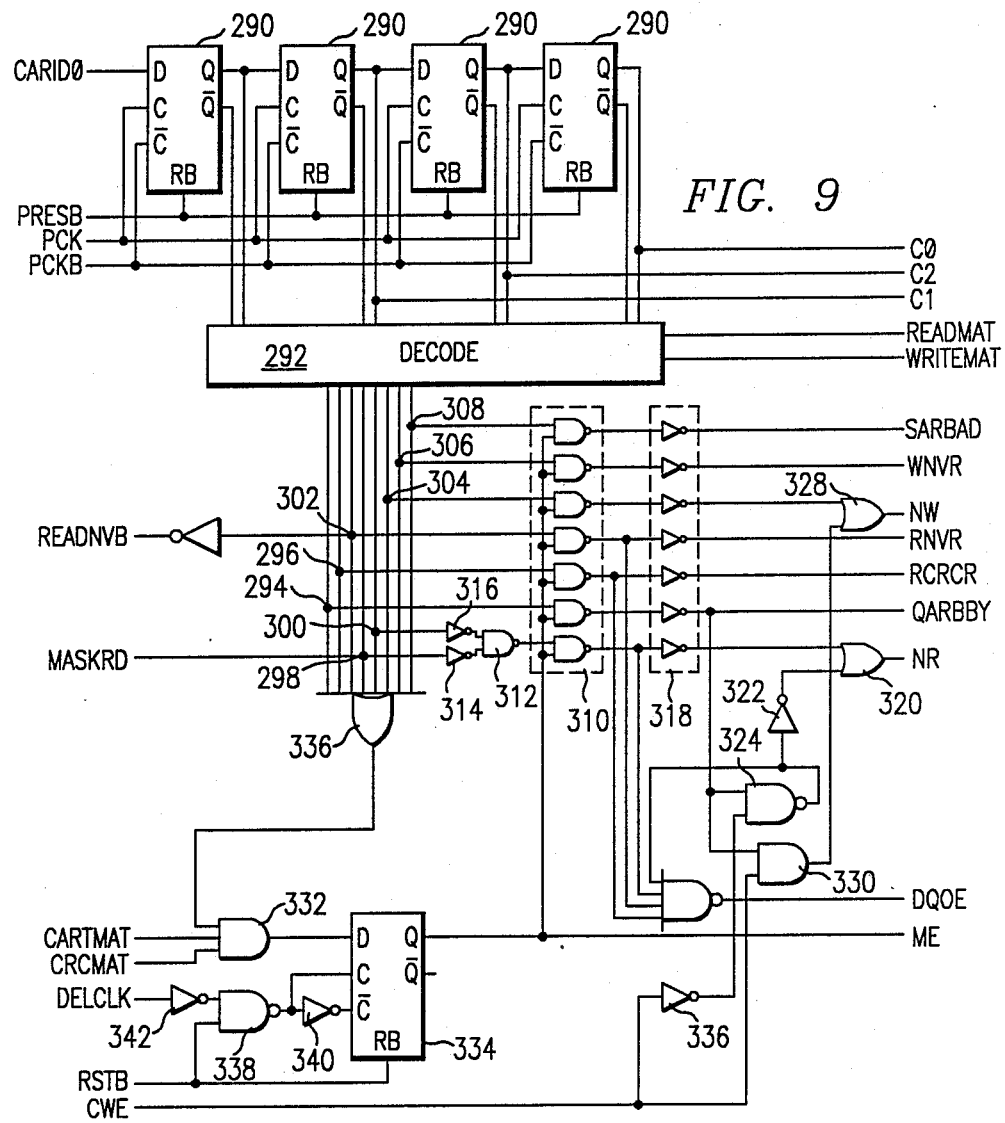

ID PROTECTED MEMORY WITH A MASKABLE ID TEMPLATE

TECHNICAL FIELD OF THE INVENTION

The present invention pertains in general to access circuitry for Random Access Memories (RAM), and more particularly, to an internal ID protected gate with an internal ID template that is compared to received ID information to determine if access will be allowed.

CROSS-REFERENCE TO RELATED APPLICATIONS

This application is related to U.S. patent application Ser. No. 194,025, entitled "Interleaved Arbitration Scheme for Interfacing Parallel and Serial Ports to a Parallel System Port" and U.S. patent application Ser. No. 194,028, titled "Dual Port RAM with Arbitration Status Register", both filed May 13, 1988, and U.S. patent application Ser. No. 202,874, entitled "ID Protected Memory with a Readable/Writable ID Template", filed on June 3, 1988.

BACKGROUND OF THE INVENTION

The introduction of low-cost microprocessors has been one impetus in the push towards distributed processing. Almost all such microprocessors have the capability and the standard interfaces to be interconnected into distributed processing systems. In such systems, processors may be installed at remote sites near where processing is needed, and intercommunication among processors is usually done utilizing serial transmission techniques.

When a processor is utilized to communicate with a plurality of peripheral units on a common data link, this processor must have some type of collision avoidance protocol associated therewith. This is especially true when the common data link is a wireless transmission system. One example is a processor/peripheral unit interface over a wireless data link which utilizes remotely disposed memories that can be accessed from a centrally disposed location. This type of system usually incorporates a number of different memories which are portable, with each memory having the ability to be interfaced with a central processor at the centralized location through the wireless data link that is shared with the other remote memories. Each of these memories therefore must be protected with some type of gating or arbitration circuit that can recognize the presence of a transmission directed toward the associated memory. It is difficult to specifically direct information to any one of the remote memories since they may move in and out of the transmission range. This is to be compared with hard wired systems, such as token ring passing systems, etc., that utilize identification codes or positions on the ring to determine the destination of a predetermined packet of data. However, most of the hard wired systems require that the ID be associated with the particular module disposed at the remote location. With these types of systems, this is easily done, as they are generally at fixed locations.

In systems where wireless transmission is utilized and remote stations can be mobile, it is virtually impossible to determine at the centralized location what remote stations are in the transmission range of the centralized location. Unless a predetermined protocol is provided wherein two-way communication is allowed, the centralized location has little information as to which remote devices or memories are in the transmission range. It merely transmits the information out with a particular ID and waits for some type of response indicating receipt of the information. However, present systems do not allow for polling of the devices on a minimal overhead basis.

BRIEF DESCRIPTION OF THE DRAWINGS

For a more complete understanding of the present invention and the advantages thereof, reference is now made to the following description taken in conjunction with the accompanying Drawings in which:

FIG. 5 illustrates a block diagram of the cartridge select block.

FIG. 9 illustrates a logic diagram of the control field block;

Figure 1:
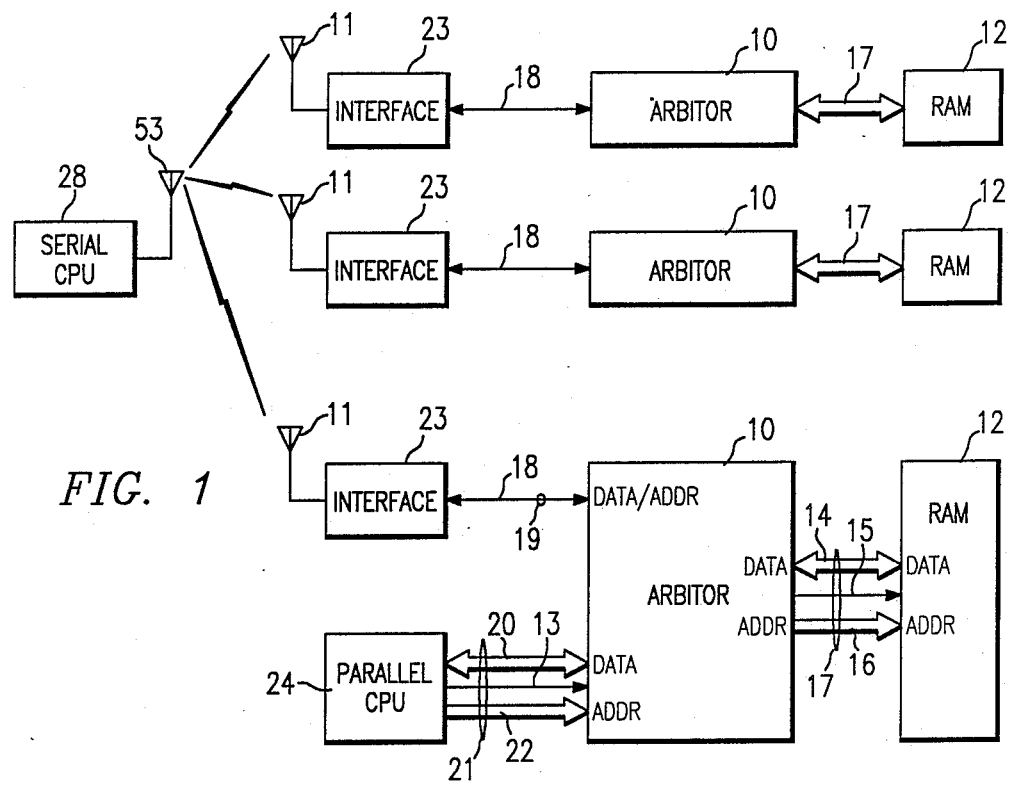
FIG. 1 illustrates a system diagram of the remotely disposed RAMs interfaced with a wireless transmission system.

It will be appreciated that for purposes of clarity and where deemed appropriate, reference numerals have been repeated in the figures to indicate corresponding features.

SUMMARY OF THE INVENTION

The present invention disclosed and claimed herein comprises an ID protected access circuit for interfacing with a common data link. The access circuit includes circuitry for receiving ID information and a mask command from the common data link. A digital word serving as an ID template is stored in an internal register and a portion of this ID template is masked off in accordance with information in the mask command. The unmasked portion of the ID is then compared with the corresponding portion of the received ID information. When a match is present, a match signal is output. In response to generation of the match signal, a response is generated by the access circuit for output on the common data link.

In another aspect of the present invention, the access circuit is interfaced with a random access memory (RAM). When the match signal is present, a Read control signal is generated and output to the random access memory. In addition, a predetermined memory location in the RAM is addressed and the contents thereof output to the common data link.

In yet another aspect of the present invention, the mask command contains coded information for a predetermined number of bits in the ID template that are to be masked off. The mask circuitry processes a decoder for decoding information in the mask command and this decoded information is utilized to force a true comparison between the bits in the received ID information corresponding to masked bits in the ID template.

DETAILED DESCRIPTION OF THE INVENTION

Remotely Disposed Memories

Referring now to FIG. 1 there is illustrated a system diagram of a plurality of remotely disposed random access memories 12. Each of the memories 12 is interfaced through a system bus 17 to an arbiter 10. The arbiter 10 in turn is interfaced through a serial port 19 to an interface circuit 23 over a serial data link 18. The interface circuit 23 being connected to an antenna 11. The antenna 11 is operable to communicate with a centrally located serial central processing unit (CPU) 28 through an antenna 53. Therefore, each of the RAMs 12 is accessible by the serial CPU 28 through the wireless data link.

The interface circuit 23 is operable to convert a serial transmission to a three-wire format on serial data link 18 to provide a serial information string, a serial clock and a reset control signal. However, it should be understood that although a wireless data link is used in the preferred embodiment, any type of transmission system whereby a plurality of remotely disposed units can be interfaced with the serial CPU 28 through a common serial data link could be utilized.

The system bus 17 is comprised of an address bus 16, a bi-directional data bus 14 and a control bus 15. In addition, the arbiter 10 is operable to interface with a parallel CPU 24 through a parallel port 21. The parallel port 21 is comprised of an address bus 22, a bi-directional data bus 20 and a control line 13. The arbiter 10 is operable to select between the parallel port 21 and the serial port 19. The function of the arbiter 10 is described in copending application, Ser. No. 194,025, and entitled "Interleaved Arbitration Scheme for Interfacing Parallel and Serial Ports to a Parallel System", which is incorporated herein by reference. The operation of the present system will be described with respect only to the serial port 19 and the wireless communication link between the serial CPU 28 and the arbiter 10.

In operation, the serial CPU 28 outputs a serial information stream that contains data and address information for routing to the RAM 12 during a Write operation in addition to control information that configures the RAM 12 for the Write operation. The serial CPU 28 also sends out address information and control information indicating a Read operation and receives data back from the RAM 12 through arbiter 10.

In the initial operation, a fifty-six bit protocol word is sent out to all of the remotely disposed RAMs 12, this protocol word loaded into an internal shift register in the arbiter 10. The protocol word has control information disposed therein in addition to an ID field containing ID information. The arbiter 10 is operable to receive the protocol word and compare the ID information within the ID field with an internally stored ID template. If the ID template matches the received ID information, the arbiter 10 then passes the appropriate control signals to the RAM 12 to perform a Read or a Write operation.

Masked Read Operation

There is an additional mode of operation of the system of FIG. 1 that is utilized to quickly determine the ID of any remote memories within the transmission range of the serial CPU 28. This is termed the "Masked Read" operation. In the Masked Read operation, the serial CPU 28 sends out a control command for the Masked Read operation in addition to a masked ID word wherein a portion of the masked ID word is masked and a portion is unmasked. The Masked Read control command is operable to control the arbiter 10 in each of the remotely disposed memories to compare only the unmasked portion of the transmitted ID word with the associated bits in the stored ID template. If there is a match, access is permitted to the memory. This is termed a "hit". A hit is determined by the serial CPU 28 in that the serial CPU 28 senses the return of data from the remotely disposed memories. Of course, since only the unmasked portion of the transmitted ID word is examined at the remote memories, there can be multiple units returning information that will be determined as a single hit. As will be described hereinbelow, the masked ID word has the masked portion sequentially reduced by two bits and all combinations of these two bits searched to very quickly narrow down the complete ID word.

Initially, the first two bits of the ID word are unmasked and all four combinations of these two bits searched and the results stored. After the first two bits have been searched, it is then necessary to search the next adjacent two bits in the ID field. An ID is therefore generated for the first four data bits wherein the first two data bits contain the bit combination that produced the hit when the first pair of data bits was searched. This will require four search operations wherein each combination of the second pair of data bits is output in the unmasked portion of the ID field in conjunction with the various combinations of the first two data bits that provided a hit in the search of the first pair of data bits. If a hit is determined by any of the four combinations in the second pair, this indicates a match for the first four data bits in the ID field. Searching is continued until all adjacent pairs of data bits have been unmasked and searched.

For the preferred embodiment, there are sixteen bits of information in the ID field, resulting in eight pairs It will then only be necessary to perform the search operation a maximum of thirty-two times to determine the address of at least one of the remote units. This is to be compared with the situation wherein every possible combination of the sixteen bit ID is output before it can be conclusively determined that there is not a unit present in the vicinity of the serial CPU 28. Since the protocol word is fifty-six bits long and this entire protocol word must be serially shifted into the internal shift register for each ID comparison, searching every ID would be time consuming.

As an example, consider an ID field that is six bits long with two remote units present in the transmission range of the central location with one unit having the ID "100010" and the other having the ID "011010". In the first and least significant pair, each of the IDs has the combination "10", and as such, a single hit would be determined when this combination was searched in the Masked Read mode. However, the serial CPU 28 does not know whether one or two units is in the transmission vicinity. When the second pair is unmasked and searched, the first two data bits in the ID field would be set to a value of "10". For the first combination searched, "0010", a hit would be determined. The second combination searched would be "1010", which would also register a hit. The remaining combinations "0110" and "1110" would not register a hit. Thereafter, the serial CPU 28 would continue the search to search the combination wherein the first four bits were set to "0010" to determine if there will be a hit. This would register for the first hit when the combination "10" were output for the third pair. This would clearly indicate to the serial CPU 28 that there was a unit in its vicinity having the ID "100010". The serial CPU 28 would then perform the search wherein the first two pairs have the value "1010" to determine the ID of the second unit when the third pair was set to a value "01".

It can be seen with the Masked Read operation that the ID of a unit can be determined by an iterative process. This iterative process requires masking off a portion of the ID field and outputting all combinations of the remaining bits to determine if access is granted. If access is granted, this information is utilized to unmask and search an additional portion of the ID field that was previously masked. This continues until the entire ID has been unmasked and searched.

In order to determine whether there is a hit, the serial CPU 28 recognizes the Masked Read command within the control information in the protocol word as a Read operation for the remote memory. This Read command is interpreted by the arbiter 10 as a Read operation to address the RAM 12 and output data onto the associated serial data link 18 after loading of the protocol word. Therefore, the serial CPU 28 is switched to a receive mode immediately after transmission of the protocol word. If the data is received, this indicates that access has been granted to at least one of the RAMs 12 within the transmission vicinity. Of course, if there is more than one unit in the vicinity, multiple data will be transmitted back to the serial CPU 28. It is only necessary that some data is received and not the content of that data. Therefore, any address can be transmitted in the control information in association with the Masked Read command.

Figure 2:
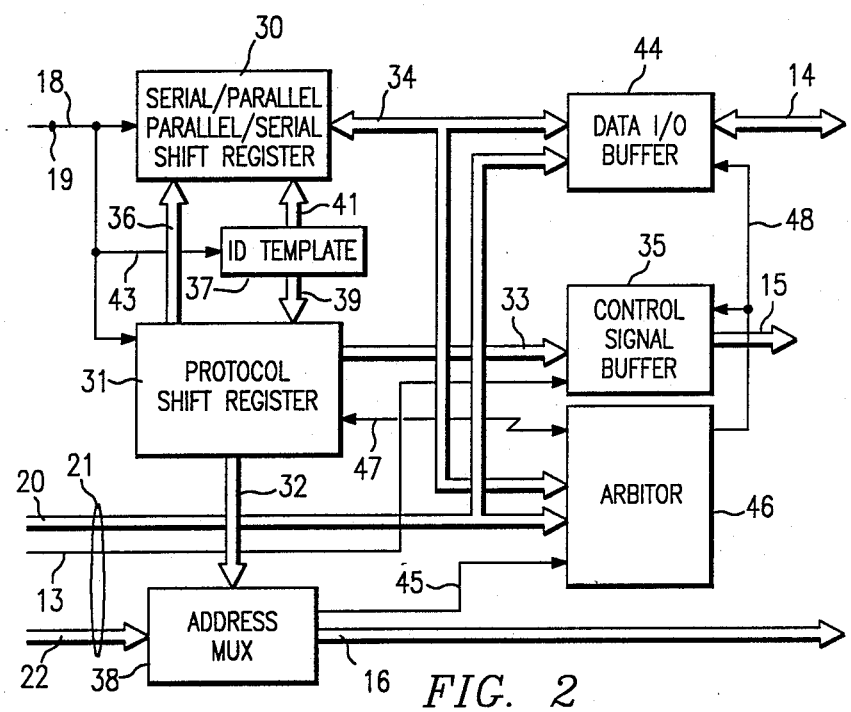
FIG. 2 illustrates a detailed block diagram of the arbiter with the ID template.

Referring now to FIG. 2, there is illustrated a detailed schematic block diagram of the arbiter 10 of FIG. 1. The serial data link 18 on the serial port 19 is connected to a serial/parallel and parallel/serial shift register 30. The shift register 30 is operable to receive serial data and convert the serial data to parallel data for output on a parallel data bus 34. Conversely, the shift register 30 is operable to receive parallel data from the bus 34 for conversion to serial data for output to serial data link 18. A protocol shift register 31 is provided which is operable to receive the serial address, ID information and control information from the serial data link 19 for decoding thereof. The decoded addresses are output as a parallel output on an address bus 32 and control information is output on a control bus 33 to a control signal buffer 35. The control signal buffer 35 outputs the control signal to the RAM 12. In addition, the protocol shift register 31 outputs a control signal to the shift register 30 to control data transfer therethrough on a line 36.

The protocol shift register 31 is also operable to output select internal control information stored therein to the shift register 30 for transmission to the serial data link 18. A parallel data bus 36 is connected between the protocol shift register 31 and the shift register 30 to allow this internal control information of the protocol shift register 31 to be transferred thereto. This will be described in more detail hereinbelow. In addition, a storage register ID template 37 is provided which is a non-volatile register for storage of an ID template. The non-volatile register 37 is a Read/Write register which has a battery backup (not shown) for maintaining the integrity of the data. The non-volatile register 37 is interfaced with the protocol shift register 31 through a data bus 39. Further, the non-volatile register 37 is also interfaced with the shift register 30 through a parallel data bus 41 to allow transfer of information in the non-volatile register 37 to the shift register 30 and out to the serial data link 18 during a Read operation of the contents of the non-volatile register 37. The contents of the non-volatile register 37 can be changed by transferring serial information thereto through a serial data link 43 connected to the serial data link 18 during a Write operation for the non-volatile register 37.

The address bus 22 and the address bus 32 are both input to an address multiplexer 38, the output of which is connected to the system address bus 16 for input to the RAM 12. The data bus 34 and the data bus 20 are input to a data I/0 buffer 44 which is interfaced with the system data bus 14. In addition, the data buses 20 and 34 are input to an arbiter 46 which is interfaced with the address multiplexer 38 through a control line 45 and to the protocol shift register 31 through a control line 47. The arbiter 46 is also interfaced with the data I/0 buffer 44 and control signal buffer 35 through control signal line 48.

In the normal Read and Write operation to the RAM 12, initialization is facilitated by a reset-bar signal from the serial data link 18 which is brought low to reset shift registers 30 and 31. After a sufficient time to reset the shift registers, the reset-bar signal is brought high and a protocol word is output by the serial CPU 28 over the wireless data link and input to the protocol shift register 31, which protocol word contains control information, ID information and address information. At the end of loading, the received ID is compared to the stored ID in the non-volatile register 37 and, if a match is indicated, an address is output from the shift register 31 on address bus 32 and the shift register 30 is configured for a Read or Write operation. Control signals are output on bus 33 to the control signal buffer 35 to the system port 17 to allow data transfer. Once the protocol word is loaded and an ID match is determined, the serial CPU 28 can then perform the Read or Write operation to the RAM 12.

In the preferred embodiment, an initial address is input to the protocol shift register 31 and then data is continually read in bytewide increments from the RAM 12 and shifted out to the serial data link 18 or shifted in for input to the RAM 12 depending upon whether a Read or Write operation, respectively, has been indicated. In order to change the control information to, for example, go from a Read to a Write operation, it is only necessary for the serial CPU 28 to change the reset input signal from a high to a low and back to a high and then transmit a new protocol word. The arbiter 46 is operable to determine which of the ports 19 or 21 have access to the system with the data I/O buffer 44, the address multiplexer 38 and control signal buffer 35, controlled in accordance with this determination. For purposes of this application, only serial access from the serial port 19 will be described herein.

Figure 3:
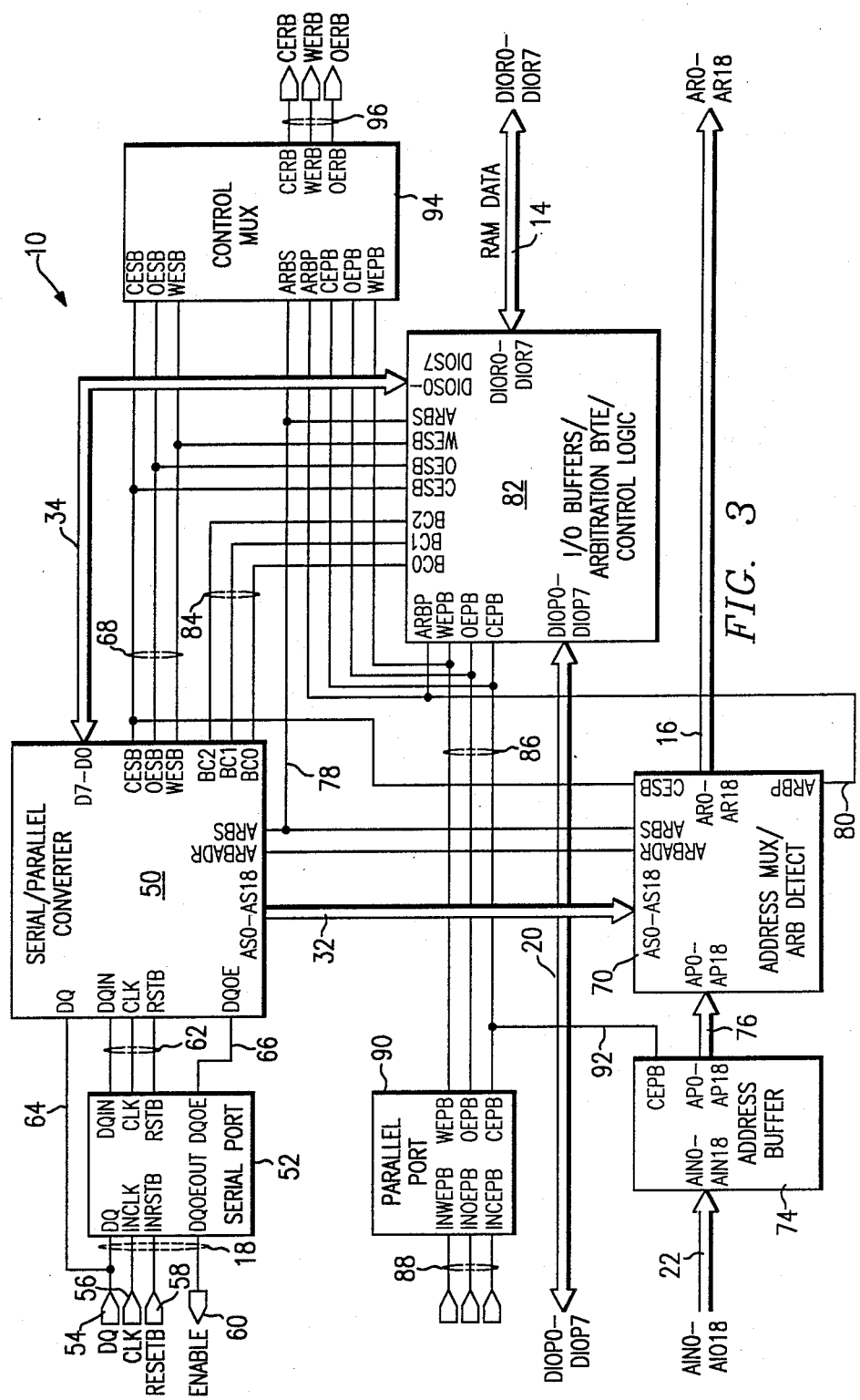
FIG. 3 illustrates a detailed block diagram of the arbiter.

Referring now to FIG. 3, there is illustrated a block diagram of the arbiter 10 of FIG. 2. The shift registers 30 and 31 are incorporated into a serial/parallel converter 50 and a serial port buffer 52. The serial port buffer 52 is operable to interface with a serial data line 54 for receiving and transmitting data on an input/output DQ, a clock line 56 for receiving a clock signal CLK, a reset pin 58 for receiving a RESET signal and an enable pin 60 for outputting a data Output Enable signal. The serial port buffer 52 is operable to interface with the serial/parallel converter 50 on three lines 62 to input received input data DQIN, the clock signal CLK and a reset signal RSTB to the serial/parallel converter 50. The serial/parallel converter 50 outputs serial data to the data pin 54 on a serial data line 64. A separate Output Enable signal DQOE is transferred from the serial/parallel converter 50 to the buffer 52 on a line 66.

The serial/parallel converter 50 is operable to receive serial data and convert it to parallel data for output on the parallel data bus 34 and receive parallel data therefrom on input data lines D0-D7. In a similar manner, a 19-bit address on address outputs AS0-AS18 is interfaced with the address bus 32. The serial/parallel converter 50 is operable to generate a byte wide count value C0-C2 on three lines 84 labelled BC0-BC2 and the three control signals representing the serial Chip Enable signal CESB, serial Output Enable signal OESB and serial Write Enable signal WESB.

The address multiplexer 38 is represented by an address multiplexer/arbitration detect circuit (multiplexer/detect) circuit 70 and an address buffer 74. The address buffer 74 interfaces on the input thereof with the parallel address bus 22 to receive the 19-bit address AIN0-AIN18 for input to the multiplexer/detect circuit 70 on a bus 76. The other parallel input of the multiplexer/detect circuit 70 is connected to the parallel address bus 32 from the serial/parallel converter 50 and the output thereof is interfaced with the system address bus 16. The multiplex/detect circuit 70 receives the signals ARBADR, CESB and ARBS from the serial/parallel converter 50 for input thereto. The multiplexer/detect circuit 70 is operable to provide a multiplexing operation for routing either the address on bus 32 or the address on bus 22 to the system address bus 16. The operation of the multiplexer/detect circuit 70 will not be described herein.

An I/O buffer control circuit 82 is provided which has three parallel data ports connected to the bus 20, the bus 34 and the system data bus 14, respectively. The control circuit 82 provides direction control logic for the arbitration function of arbiter 46. The control circuit 82 receives the count value of C0-C2 from the serial/parallel converter 50 on lines 84 and the serial port control signals CESB, OESB and WESB on lines 68. The arbitration match signals ARBP and ARBS on lines 80 and 78 are also input thereto in addition to parallel port control signals WEPB, OEPB and CEPB, representing the Write Enable, Output Enable and Chip Enable signal, respectively, on lines 86. The lines 86 are interfaced with input control lines 88 from the parallel port through parallel port control buffers 90. The Chip Enable signal is output from the parallel port control buffers 90 and is also input to the address buffers 74 through a line 92.

The Chip Enable, Output Enable, and Write Enable signals for both the parallel and the serial ports on the lines 86 and 68, respectively, are input to a control multiplexer 94 in addition to the parallel and serial arbitration match signals ARBP and ARBS on lines 80 and 78. The control multiplexer 94 outputs the control signals CERB, WERB, OERB, representing the system Chip Enable, Write Enable, and Output Enable signals respectively, for input to the RAM 12 on lines 96. For purposes of the present invention, the control multiplexer is configured to select the serial port control signals.

Serial/Parallel Converter

Figure 4:
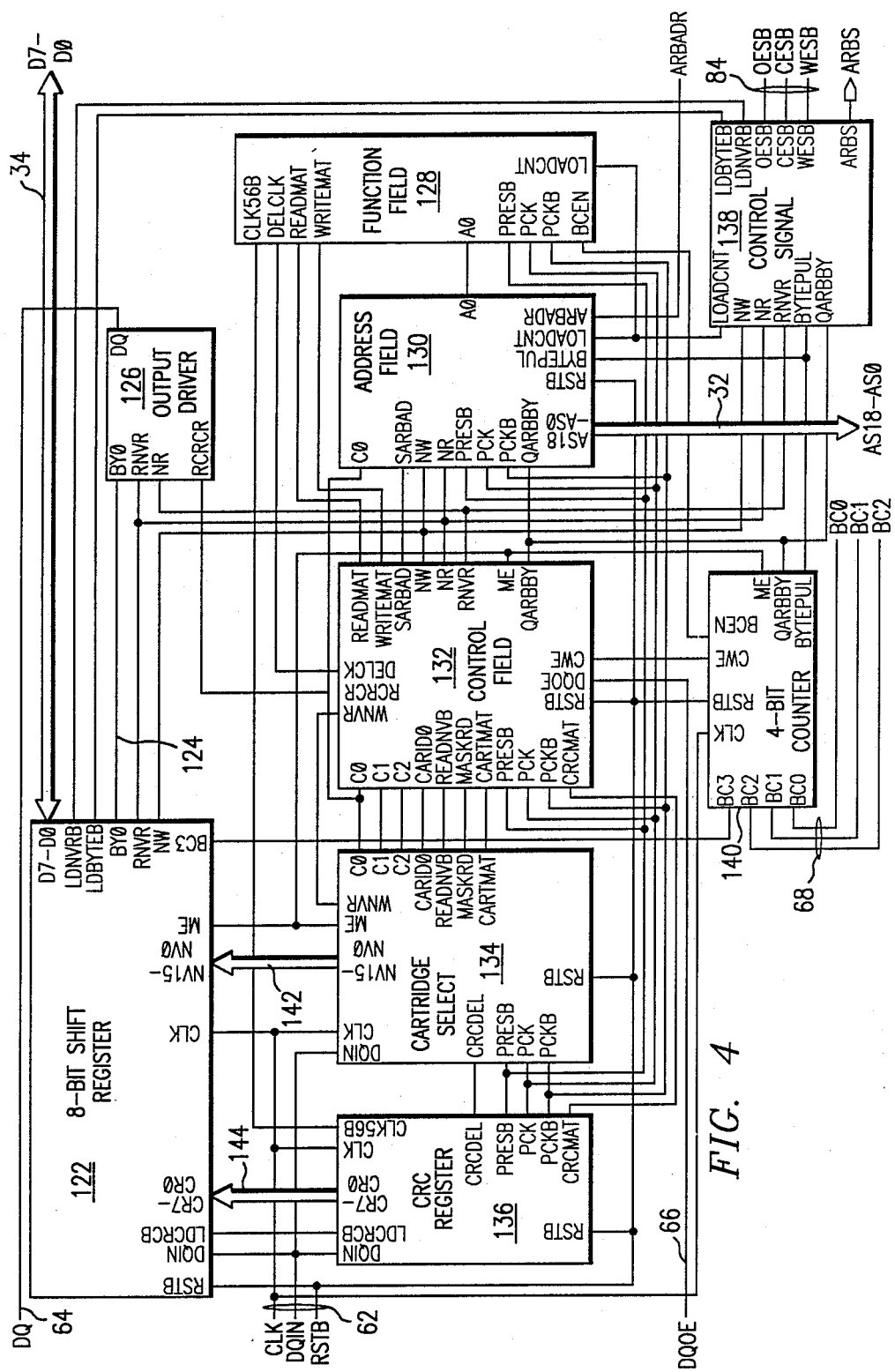
FIG. 4 illustrates a block diagram of the serial/parallel and parallel/serial shift register and protocol shift register.

Referring now to FIG. 4, there is illustrated a block diagram of the serial/parallel converter 50 of FIG. 3. The DQIN input from lines 62 is input to an eight-bit shift register 122 which is operable to receive on the input thereof serial data and convert it to parallel data for output on bus 34 through outputs D0-D7. The shift register 122 provides the function of the shift register 30. Conversely, on a Read operation, data is received on the parallel data inputs D0-D7 and collected in the shift register 122 for shifting out on an output BY0 to an output line 124. The output line 124 is connected to the input of an output driver 126 which is connected to the DQ output line 64. The eight-bit shift register is clocked by the CLK signal and reset by the RSTB signal from the lines 62. Therefore, after a Read or Write function is determined, data can be sequentially input to the eight-bit shift register 122 during the Write operation and then output on the data bus 34. As will be described hereinbelow, an initial address is input to the serial/parallel converter and then this address internally incremented such that only a continuous stream of data is transferred thereafter.

Protocol Shift Register

Initially, after a reset signal is received, a protocol word comprising a fifty-six bit string of data is input to the serial/parallel converter 50 to provide a function field, address field, a control field, an identification (ID) field and an error check field. The function field is collected in a function field block 128 which is operable to determine whether a Read or Write operation will occur, and is comprised of the first eight bits of the protocol word. The address information is stored in an address field block 130 which stores the next nineteen bits of the protocol word to determine the initial address. The control field is comprised of the next five its of the protocol word which are stored in a control field block 132. This determines the specific type of Read or Write operation that will occur. The ID field is comprised of the next sixteen bits of the protocol word and is stored in a cartridge select block 134, and provides the function of comparing the sixteen bit ID with an internally stored reference in the ID template 37 and then outputting a match signal if the ID is correct. Error checking is provided through a cyclical redundancy check scheme and is provided by the next eight bits of the protocol word in a CRC register circuit 136. The function block 128, address field block 130, control field block 132, cartridge select block 134, and CRC register 136 are arranged in a serial fashion such that the protocol word is input to the CRC register 136 until all fifty-six bits are serially loaded through the CRC registers and the remaining circuitry until the first eight bits input thereto reside in the function field block 128. This circuitry comprises the protocol shift register 31. After completion of loading into the protocol shift register, the appropriate operation is selected and data either read from the RAM 12 or written thereto. The operation of each of these registers will be described hereinbelow.

Referring further to FIG. 4, the general operation of each of the fields in the protocol shift register 31 will be described. The function field block 128, as described above, is operable to provide a signal that will indicate if a Read or a Write operation is to occur. In addition, the function field circuit 128 determines when the end of the fifty-six bit protocol word is loaded into the protocol shift register. When the fifty-sixth bit is loaded in, a signal is output on a line CLK56B for input to the CRC register 136 to inhibit further loading of data in the internal registers therein. Since data is continuously loaded in through the DQIN line, it is necessary to inhibit further shifting of data through the protocol shift register. A global protocol RESET input PRESB is provided for resetting the entire protocol shift register with a protocol clock and the inverse thereof represented by signals PCK and PCKB, respectively, provided for generating the clocking signal for shifting data through the protocol shift register 31.

As described above, the data field for the function field block 128 is eight bits wide. Within these eight bits is encoded a Read instruction or a Write instruction. The function field block 128 determines whether the Read instruction is present or the Write instruction is present. If the Read instruction is present, a signal is output on a READMAT line, and if a Write instruction is present, a signal is output on a WRITEMAT line, both lines being input to the control field block 132. The serial input to the function field block 128 is received on an A$\emptyset$ input.

When the last bit of the protocol word is loaded into the protocol shift register 31, the clock is delayed by a predetermined amount of time to allow the information to be examined and the proper functions to be output. This signal is output on a line DELCLK which is input to the control field block 132. In addition, a pulse is generated at the end of the loading operation for the protocol shift register and output on a line LOADCNT, which signal is input to the address field block 130 and to a control signal block 138. The LOADCNT signal indicates the end of the loading operation for the protocol shift register and enables the address stored in the address field block 130 to be loaded into an internal counter therein. A signal BCEN is provided for output from the function field block 128 to the input of a four-bit counter 140 to initiate the count thereof. The signal BCEN is generated eight clock cycles prior to completion of the loading of the protocol shift register such that the count bits BC$\emptyset$-BC2 reflect a count value that can be examined by the parallel port for use in the arbitration scheme, which is not described herein. On a Read operation, the initial address is immediately output from the address field block 130 at the end of loading the protocol word. This allows transfer of data from bus 34 to the eight-bit shift register 122 and serial output on the DQ data line 64 on the falling edge of the next eight clocks of the serial clock.

The address field block 130 is comprised in part of a serial shift register for storing a nineteen-bit address for parallel output to an internal counter. The counter is operable to be loaded by the LOADCNT signal and then output the contents thereof to the address bus 32. The counter is then operable to be incremented at the end of every byte by a signal BYTEPUL. The internal counter can only be incremented in the presence of a normal Read signal NR or a normal Write signal NW indicating a Read or Write operation. A control signal QARBBY provides a query function for the serial port to determine internal arbitration status information, and during the query, incrementing of the counter is inhibited.

The control field block 132 receives a five-bit control field, which field is decoded to provide the various control signals in addition to receiving signals from the other blocks in the protocol shift register for decoding thereof. The control field block 132 generates the NW and NR signals for the normal Read and Write operation after it is determined that there is a Read and Write match from the function field block 128. Additionally, the control field block 132 is operable to control the Read and Write operation to the cartridge select block 134 and also the Read operation of the CRC register 136. To write to the cartridge select block 134, a Write command WNVR is operable to control the cartridge select block 134 to connect an internal nonvolatile memory to the DQIN line. Thereafter, the next sixteen bits input thereto are stored as an internal identification code. In another mode, it may be desirable to read the contents of the nonvolatile memory in the cartridge select block 134. The RNVR signal is then generated and the contents of the nonvolatile memory loaded in two groups of eight bits each onto the parallel port of the eight-bit shift register 122 for output through the output driver 126 on the next sixteen clock cycles.

The contents of a CRC register 136 are controlled by a signal RCRCR which is input to the output driver 126. The CRC register 136, as will be described hereinbelow, contains a serial shift register that is eight bits wide which is disposed in serial with the protocol word. At the end of a Read or a Write operation, the contents of the CRC register 136 are automatically loaded into the eight-bit shift register 122 and, if it is desirable to read this information, another command sequence is issued that generates the RCRCR signal. The contents of the eight-bit shift register 122 are shifted out through the output driver 126 to the DQ line 64.

A signal DQOE is generated representing the Output Enable signal for a Read operation on line 66. This is utilized in a four wire system wherein the serial CPU 28 requires status information to enable it to tri-state its transmit/receive port such that it is ready to receive data from the arbiter 10.

A cartridge match signal (CARTMAT), a CRC match signal (CRCMAT) and the delayed clock signal (DELCLK) are all received and utilized to generate a Master Enable signal (ME). This is an indication that the protocol shift register is loaded and ready, and that the CRC register 136 provides a match, the ID matches in the cartridge select block 134, and a valid command has been received.

The control field block 132 also decodes a signal CWE for compressed Write Enable and a signal MASKRD for a Masked Read function. Outputs C$\emptyset$, C1 and C2 constitute the least significant bit and the following two bits of the control field. These are utilized in the Masked Read operation, which bits are decoded in the cartridge select block 134. A signal READNVB is provided for output to the cartridge select block 134 when the nonvolatile memory containing the prestored ID is read. This signal forces the CARTMAT signal to a high, indicating that there is an ID match in the cartridge select block 134. Otherwise, operation would be inhibited and no Master Enable signal ME would be generated. The input to the control field block 132 is the CARID∅ input.

The cartridge select block 134 has an internal storage register referred to as a nonvolatile register 37, which nonvolatile memory is interfaced with the eight-bit shift register 122 on the parallel input thereto through a bus 142 to allow data stored therein to be read out. The bus 142 corresponds to bus 41 in FIG. 2. Additionally, the cartridge select block 134 contains a sixteen-bit shift register which is a portion of the fifty-six bit protocol word and is operable to store the received identification code therein that is to be compared with the contents of the nonvolatile memory. A true comparison results in a high logic signal on the CARTMAT output. A DQIN input is provided for interfacing the input of the internal nonvolatile memory with the DQIN input pin on line 62, whereas the internal shift register has the input thereof connected to the CRCDEL output of the CRC register 136. Therefore, the cartridge select block 135 is operable to have the nonvolatile memory therein written to or read from, and also receive the sixteen-bit cartridge match field for comparison with the ID stored in the internal nonvolatile memory or ID template 37.

The CRC register 136 is operable to receive the eight-bit CRC field in the fifty-six bit protocol word and process this information in accordance with a predetermined cyclic redundancy check algorithm to determine if there is a match, which signal is output on the CRCMAT line. In addition, the contents of the register can be read out to the parallel input of the eight-bit shift register 122 on a bus 144, as described above. The bus 144 corresponds to bus 36 of FIG. 2.

The control signal block 138 is operable to output the Output Enable signal, Chip Enable signal and Write Enable signal at the end of each byte of data. During operation wherein data is being read from the memory, a BYTEPUL is generated by the four-bit counter 140 at the beginning of each byte to load the eight-bit shift register 122. During a Write, BYTEPUL signal is generated at the end of each byte to indicate the eight-bit shift register 122 as being full. This pulse, in conjunction with the NR and NW signals, results in the generation of the signals on the system control lines 84 for enabling data transfer. In addition, the control signal block 138 outputs loading signals to eight-bit shift register 122 to enable the eight-bit shift register 122 to load data in from the cartridge select block 134 or the data bus 34. The load signal LDNVRB is generated when the contents of the nonvolatile memory in the cartridge select block 134 are to be loaded into the eight-bit shift register 122 and a load signal LDBYTEB is generated when the data on the data bus 34 is to be loaded into the eight-bit shift register 122.

During operation of the control signal block 138, it is important during a Read operation that the information from the RAM 12 be transferred into the eight-bit shift register 122 prior to serially shifting out data of the first full byte from shift register 122. Therefore, the signal LOADCNT is utilized by the control signal block 138 to load the initial value of data into the eight-bit shift register 122 immediately after the protocol word is loaded. Thereafter, the BYTEPUL signal controls loading.

In operation, the fifty-six bit protocol word is first loaded into the protocol shift register after receiving a reset signal. When the protocol word is loaded, the control field block 132 determines if the CARTMAT output, indicating an ID match, and the CRCMAT signal, indicating no errors, are both high. After the predetermined amount of delay provided by the DELCLK signal, the Master Enable signal ME is then generated which enables the eight-bit shift register 122 and the four-bit counter 140 to allow reading or writing of data from the RAM 12. The Read or Write function is first determined by the function field block 128 and then the address loaded into the internal counter in the address field block 130. This address is then output therefrom to the address multiplex/detect circuit 70 for input to the RAM 12. This is in response to the LOADCNT signal. At the same time, data on the data bus 34 is loaded into the eight-bit shift register 122 on a Read operation and then output through the output driver 126 to the DQ line 64. On a Write operation, the eight-bit shift register 122 is first loaded and then shifted out to the data bus 34 in response to generation of the BYTEPUL signal by the four-bit counter 140. This continues until the Read or Write function is completed. During this time, the four-bit counter 140 generates the count value BC∅–BC2 on the line 68 for input to the arbitration byte 38.

Referring now to FIG. 5, there is illustrated a detailed block diagram of the cartridge select block 134 illustrating the operation of the Masked Read function. Each of the fields 128-136 in the protocol word is comprised of a serial shift register. The cartridge select block 134 has a sixteen-bit ID field shift register 100 having a serial input on a line 102 and a serial output on a line 103. The serial output 103 is connected to the serial input of the control field block 132. The contents of the ID field shift register 100 are output in a parallel format to a compare circuit 104. The compare circuit 104 has another input that is connected to the nonvolatile register 37 containing the ID template through a masking circuit 106. The bit mask circuit 106 is operable to mask off a portion of the sixteen-bit ID stored in the nonvolatile register 37 for comparison with the contents of the ID field shift register 100. The masking circuit 106 receives the three bits C∅–C2 and the Masked Read control signal MASKRD that are output by the control field block 132.

In operation, the compare circuit 104 and the masking circuit 106 are operable to only compare the unmasked portion of the ID template stored in register 37 with the contents of the ID field shift register 100. If the unmasked portion provides a match, this is indicated on the CARTMAT output. Therefore, the portion of the ID field stored in shift register 100 that is associated with the masked portion of the ID is not utilized in determining the state of the CARTMAT output. The operation of this circuit will be described in more detail hereinbelow.

CRC Register

Figure 6:
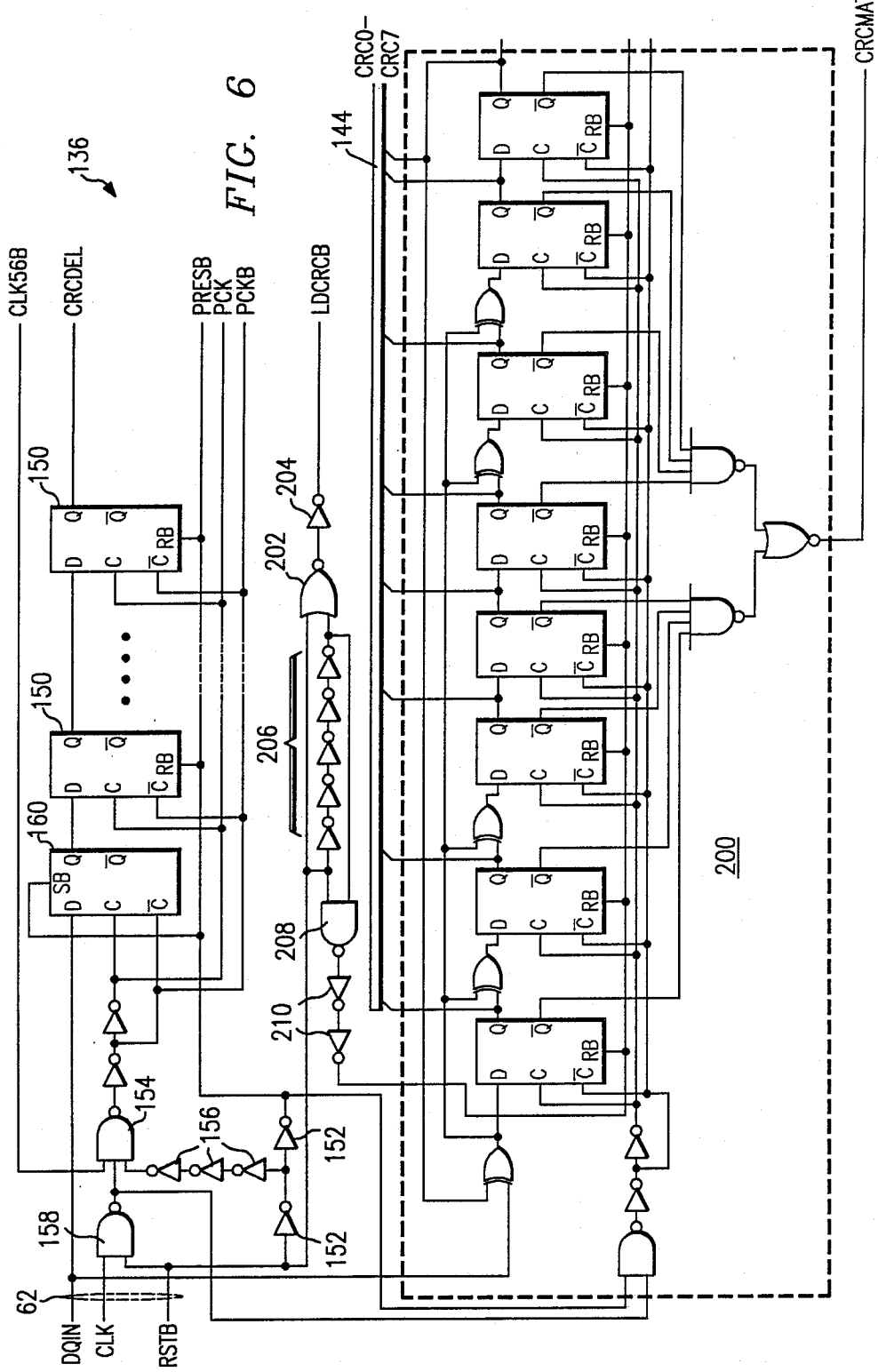
FIG. 6 illustrates a logic diagram of the CRC register.

Referring now to FIG. 6, there is illustrated a logic diagram of the CRC register 136. An eight-bit shift register is provided with seven serially connected D-type flip flops 150, each flip flop 150 having the input thereof connected to the Q-output of the previous flip flop in the string. The Q-output of the final flip flop 150 in the shift register provides the CRCDEL signal for input to the cartridge select block 134.

The reset input of the flip flops 150 are all connected together and to the RSTB signal on line 62 through two inverters 152. The clock and clock-bar inputs are connected to the output of a three input NAND gate 154, one input of which is connected to the CLK56B signal, one input of which is connected through three inverters 156 and one of the inverters 152 to the RSTB input and the other input of which is connected to the output of a two input NAND gate 158. The NAND gate 158 has one input thereof connected to the CLK signal and the other input thereof connected to the RSTB signal. The NAND gate 158 and the NAND gate 154 provide a clock signal which is inhibited upon the generation of the CLK56B signal indicating the end of a loading operation for the protocol shift register. Therefore, the clock operates only in the presence of a high on the CLK56B line and a logic high on the RSTB line. The reset signal PRESB, the clock signal PCK and the inverse thereof are generated by the gating circuit comprised of the NAND gates 154 and 158 and the inverters 152 and 156.

The input to the first flip flop 150 in the eight-bit shift register is connected to the Q-output of a D-type flip flop 160. In the protocol shift register, the Q-output of the flip flop 160 is connected to the D-input of the first flip flop 150 in the shift register and the D-input of the flip flop 160 is connected to the DQIN terminal. When the flip flops 150 are reset to zero on the reset input thereof, the flip flop 160 is set to a logic "1" with the set input thereof being connected to the reset inputs of the flip flops 150 and to the reset signal RSTB through inverters 152. Therefore, upon loading of the protocol shift register 31, a "1" is always pushed through the shift register. The CLK56B signal is generated when this "1" is detected at the end of the field.

The CRC error detection function is provided by a circuit 200 that determines whether there are any errors in accordance with a predetermined cyclical redundancy check algorithm. The circuit 200 provides a parallel output of the contents thereof on a bus 144 for output to the eight-bit shift register 122.

The LDCRCB signal is provided with a pulse generating circuit comprised of a two-input NOR gate 202 disposed in series with an inverter 204, one input of the NOR gate 202 connected to the RSTB signal and the other input thereof connected to the RSTB signal through five series-connected inverters 206. The pulse is generated on the falling edge of the RSTB signal. The output of the series connected inverters 206 is also input to one input of a NAND gate 208, the input of which is connected to the signal RSTB and the output of which is connected through two series-connected inverters 210 of the circuit 200 to provide a pulse on the rising edge of the RSTB signal to reset the CRC circuit 200 prior to sending the first bit of the protocol.

Cartridge Select Block

Figure 7:
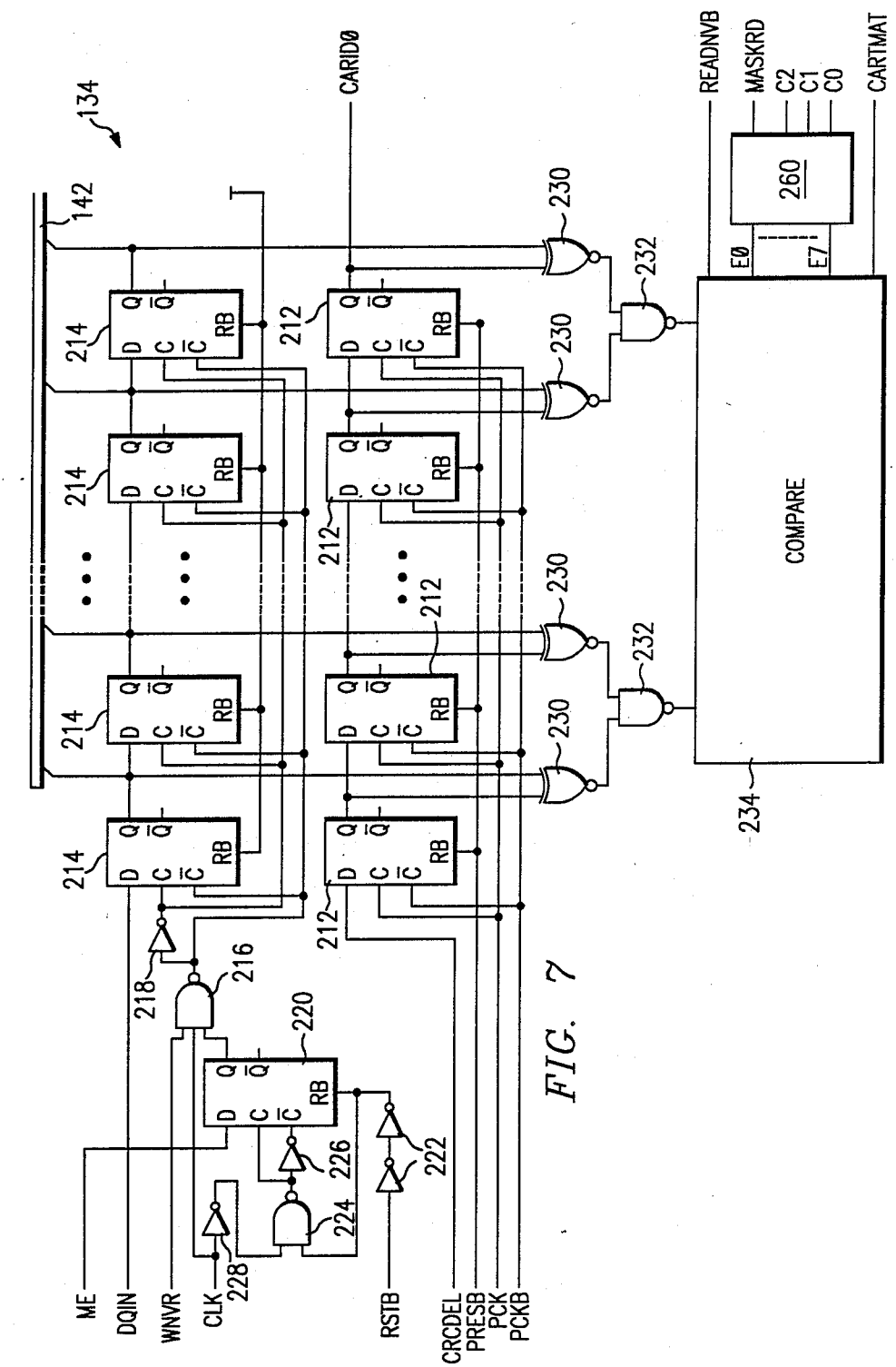
FIG. 7 illustrates a logic diagram of the cartridge select block with the ID template.

Referring now to FIG. 7, there is illustrated a logic diagram of the cartridge select block 134. The cartridge select block 134 is comprised generally of a sixteen-bit serial shift register disposed between the input CRCDEL and the output CARID∅. The shift register is comprised of sixteen individual D-type flip flops 212, each having the D-input thereof connected to the Q-output of the previous flip flop 212. The clock input is connected to the PCK input and the clock-bar input is connected to the PCKB input with the reset input connected to PRESB. The first flip flop 212 in the shift register has the D-input thereof connected to the CRCDEL input and the last flip flop 212 in the shift register has the Q-output thereof connected to the CARID∅ output.

The cartridge select block 134 also contains a sixteen-bit nonvolatile register comprised of D-type flip flops 214 that constitutes the non-volatile register 37. Each of the flip flops 214 has the D-input thereof connected to the Q-input of the previous flip flop and the D-input of the most significant bit (MSB) connected to the DQIN input. The reset input of each of the flip flops 214 is connected to a positive voltage. The clock input of each of the flip flops 214 is connected to the output of a NAND gate 216 through an inverter 218, and the clock-bar input of each of the flip flops 214 is connected to the output of the three input NAND gate 216. The NAND gate 216 has one input thereof connected to the WNVR input associated with the Write Nonvolatile Memory command, the second input thereof connected to the CLK input which, as described above, is the system clock that is not inhibited in the CRC register 136, and the third input thereof connected to the Q-output of a D-type flip flop 220. The D-input of flip flop 220 is connected to the Master Enable signal ME with the reset input thereof connected through two inverters 222 to the RSTB input. The clock input of flip flop 220 is connected to the output of a two input NAND gate 224 and the clock-bar input thereof is also connected to the output of NAND gate 224 through an inverter 226. One input of NAND gate 224 is connected to the output of the inverters 222 and the other input thereof is connected through an inverter 228 to the CLK signal. In operation, the CLK signal is inhibited from passing through the NAND gate 216 until both the WNVR signal is generated and the ME signal is generated. The flip flop 220 is operable to clock the ME signal through on the rising edge of the CLK signal. In this manner, the contents of the nonvolatile memory stored in the flip flops 214 is protected until the WNVR signal and the ME signal are generated. At that time, data can be shifted in from the DQIN input into the flip flops 214 to provide the predefined identification code that is stored in the cartridge select block 134 for later comparison to the received identification code. Therefore, the serial CPU must first access the RAM 12 by transmitting the correct ID code and appropriate command signal thereto in order to write a new ID code to the nonvolatile register 37. The command indicates a Write operation of the contents of flip flops 214, and the next sixteen bits of data will constitute a new ID code for storage in the flip flops 214.

The Q-outputs of each of the sixteen flip flops 214 is connected to one output line of the bus 142 labelled NV∅ through NV15. These output lines are arranged such that the first eight bits associated with lines NV∅-NV7 are selectively interfaced with the eight inputs of the eight-bit shift register 122. Thereafter, the next eight bits associated with output lines NV8-NV15 are interfaced with the same eight bits in the eight bit shift register 122. Since there are sixteen bits, when reading the nonvolatile memory, it is necessary to first load the eight bits associated with outputs lines NV∅-NV7 into the eight-bit shift register 122 and then transfer them out of the shift register 122 followed by loading in of the next eight bits associated with output lines NV8-NV15. This operation will be described hereinbelow with reference to the detailed operation of the eight-bit shift register 122.

The Q-output of each of the flip flops 214 is input to one input of an Exclusive NOR gate 230, the other input of the Exclusive NOR gate 230 being connected to the Q-output of the associated one of the flip flops 212 in the serial shift register. If both of the bits match, the output of the Exclusive NOR gate 230 is a logic "1" to indicate a match. Thereafter, the outputs of the Exclusive NOR gates 230 for each of the associated flip flops 212 in the serial shift register and the flip flops 214 in the nonvolatile register are compared to determine if there is a match in all sixteen bits. In the preferred embodiment, adjacent bits have the outputs of the associated Exclusive NOR gates 230 connected to the inputs of a two-input NAND gate 232, the output of which is connected to the input of the compare circuit 104. This results in reduction of the inputs to the compare circuit 104 to eight inputs. Compare circuit 104 utilizes combinatorial logic to determine if eight logic lows are present on the eight outputs of the NAND gates 232.

The compare circuit 104 also receives the READNVB input which is utilized to force the CARTMAT signal to a logic high during reading of the nonvolatile memory comprised of flip flops 214. This constitutes the Read operation of the non-volatile register 37. It is not necessary to have a valid ID in the fifty-six bit protocol word but, rather, it is only necessary to have the Read command for the non-volatile register 37 present in the control field. This overrides the operation of the compare circuit. The compare circuit 104 is essentially a multiple input NAND gate that requires the outputs of all of the NAND gates 232 to be at a predetermined logic state in order to provide the CARTMAT output indicating a match function. Additionally, an OR function is also provided for receiving the READNVB signal and ORing it with the AND function of the output of NAND gates 232 to provide the CARTMAT signal, regardless of what the output of the NAND gates 232 are. This circuit is realized with a plurality of multiple input NAND gates associated with each of the NAND gates 232 and each having one input thereof connected to the READNVB input. The output of each of these NAND gates is then input to one input of a multiple input NAND gate, the output of which provides the CARTMAT signal. Therefore, if the READNVB signal is taken low, the CARTMAT signal is generated. In a similar manner, if all of the outputs of the NAND gates 232 go low, the CARTMAT signal is also generated. Therefore, generation of the READNVB signal at an active low results in generation of the CARTMAT signal regardless of the contents of the shift registers 212.

The cartridge select block 134 also provides for the Masked Read function which, as described above, is utilized to determine a match on only two of the bits at a time. The Masked Read operation utilizes the three least significant bits C0, C1 and C2 in the control field, which bits are input to an enable decode circuit 260 which outputs enable signals E0-E7. Enable signals E0-E7 are operable to force the compare circuit 234 to a match condition for one to seven of the eight outputs of NAND gates 234 and that one pair to seven pairs of bits is examined.

Figure 8:
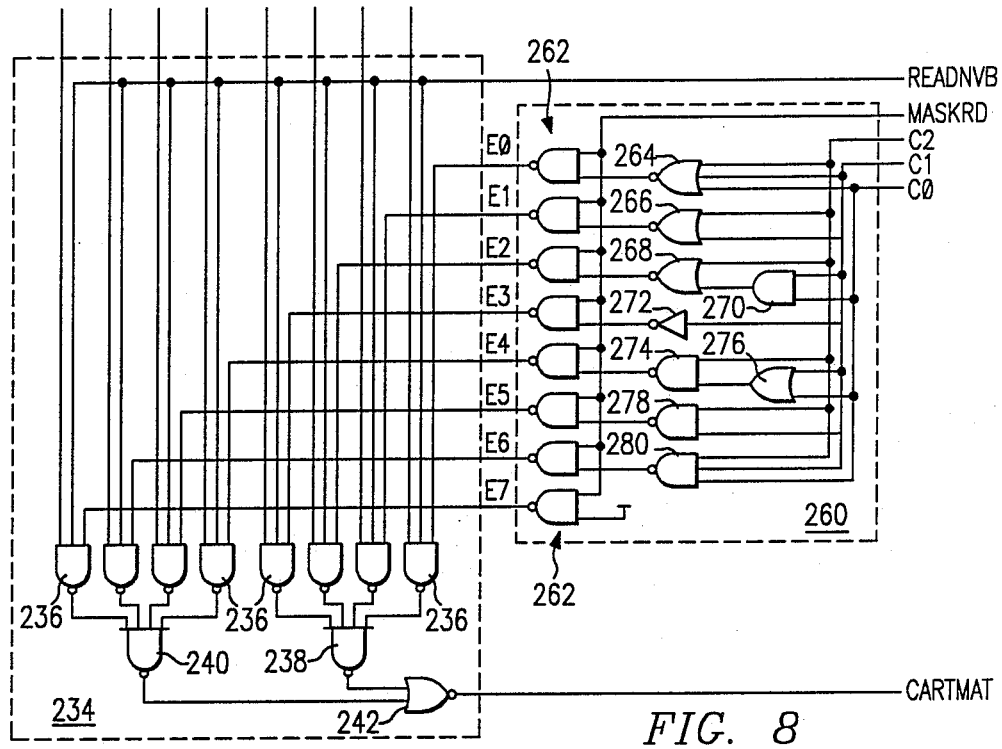
FIG. 8 illustrates a logic diagram of the compare circuit and enable decode circuit.

Referring now to FIG. 8, there is illustrated a logic diagram for the compare circuit 104 and the enable decode circuit 260. The compare circuit 104 is comprised of a plurality of three input NAND gates 236, each having one input thereof connected to the output of one of the NAND gates 232. A second input on each of the NAND gates 236 is connected to the READNVB signal and the third input thereof is connected to one of eight output lines from the enable decode circuit 260. Each of the NAND gates 236 is associated with a pair of bits in the sixteen-bit ID field with the output of NAND gate 232 associated with any of the NAND gates 236 representing a valid compare signal when the output is a logic "low". Therefore, when the output of all of the NAND gates 232 are at a logic low, this represents a match. It can be seen that if the READNVB is also low, this forces a match. In a similar manner, each of the eight lines output by the enable decode circuit 260 forces a match on the associated pair of bits in the ID field.

The output of the first four NAND gates 236 associated with the first eight bits in the ID field are input to a four-input NAND gate 238. The remaining four NAND gates 236 associated with the remaining eight bits in the ID field have the outputs thereof input to a four-input NAND gate 240. The outputs of NAND gates 238 and 240 are input to a NOR gate 242, the output of which comprises the CARTMAT signal. In operation, when all of the inputs to any of the NAND gates 236 are high, the output thereof is zero, resulting in a high on the output of NAND gate 238 or 240. CARTMAT is low in this condition. If a zero is present on at least one of the inputs of each of the NAND gates 236, a low logic level is output on NAND gates 238 and 240, forcing CARTMAT to a logic high. As will be described hereinbelow with respect to the Masked Read function, any pair of data bits can be masked off from the compare operation or any combination of pairs of data bits such that only the unmasked bits must provide a true comparison with the associated bits in the nonvolatile memory to provide a match. This is facilitated by selectively causing the output lines from the enable decode circuit 260 to go low.

The enable decode circuit 260 has eight NAND gates 262, the outputs thereof providing the output signals E0-E7 associated with the eight pairs of data bits in the ID field. Each of the NAND gates 262 have one input thereof connected to the MASKRD signal. The other input of the E0 NAND gate 262 is connected to the output of a three input NOR gate 264, the three inputs thereof connected to C0, C1 and C2, respectively. The other input of E1 NAND gate 262 is connected to the output of a two-input NOR gate 266, one input thereof connected to C2 and the other input thereof connected to C1. The other input of the E2 NAND gate 262 is connected to the output of a NOR gate 268, one input of which is connected to the C2 input and the other input of which is connected to the output of an AND gate 270. The AND gate 270 has one input thereof connected to C1 and the other input thereof connected to C0. The E3 NAND gate 262 has the other input thereof connected through an inverter 272 to C2. The E4 NAND gate 262 has the other input thereof connected to the output of a NAND gate 274, one input of which is connected to C2 and the other input of which is connected to the output of an OR gate 276. The OR gate 276 has one input thereof connected to C1 and the other input thereof connected to C0. The E5 NAND gate 262 has the other input thereof connected to the output of NAND gate 278, NAND gate 278 having one input thereof connected to the C2 and the other input thereof connected to C1. The other input of E6 NAND gate 262 is connected to the output of a three input NAND gate 280, one of the inputs thereof connected to C0, C1 and C2 respectively. The other input of E7 NAND gate 262 is connected to the positive supply.

The E0-E7 outputs of enable decode circuit 260 are operable to initially mask all but one pair of data bits, the two least significant bits, and then sequentially unmask adjacent pairs. For example, when the C2-C0 value is "000", all of the eight pairs are masked. When the value changes to "001" with C0 going high, E0 goes high and unmasks the first pair of bits. When the value changes to "010" with C1 going high and C0 and C2 going low, both E0 and E1 go low, unmasking the first two pairs of bits in the ID field. This continues by sequentially unmasking adjacent pairs of bits until seven pairs have been scanned. When the eighth pair is scanned, it is not necessary to generate the MASKRD command since a normal Read operation will scan the entire ID field. Therefore, it can be seen that the Masked Read operation first scans the initial pair of bits in the ID field to determine if there is a match with any combination of those bits and, then, utilizing this information, the next two bits are scanned in conjunction with the first two bits.

Control Field Block

Referring now to FIG. 9, there is illustrated a logic diagram of the control field block 132 in the protocol shift register 31. The control field block 132 is generally comprised of five D-type flip flops 290, each having the D-input thereof connected to the Q-output of the preceding flip flop in the shift register string with the D-input of the first flip flop 290 comprising the most significant bit and having the input thereof connected to the CARID0 input and the last flip flop 290 in the shift register comprising the least significant bit and having the Q-output thereof connected to the C0 output terminal. The clock input of each of the flip flops 290 is connected to the PCK input with the clock-bar input thereof being connected to the PCKB input. The resets of all of the flip flops 290 are connected to the PRESB input. The Q-outputs comprise the control bits C0-C4.

The Q- and Q-bar outputs of flip flops 290 for the bits C0-C4 are input to a decode block 292 which is operable to generate eight decoded outputs corresponding to eight separate commands. Each of these commands is determined by the contents of the control field. The READMAT and WRITEMAT signals from the function field block 128 are input to the decode block 292 as two additional signals for the decode function provided by the decode block 292. The eight outputs are labelled with reference numerals 294 through 308. The output 294 corresponds to the compressed READ/WRITE/READ operation, the output 296 corresponds to the Read operation for the CRC register 136, the output 298 corresponds to the Masked Read operation, the output 300 corresponds to the Normal Read operation, the output 302 corresponds to the reading of the nonvolatile register in the cartridge select block 134, the output 304 corresponds to the Normal Write operation, the output 306 corresponds to the Write operation for the nonvolatile register in the cartridge select block 134 and the output 308 corresponds to an arbitration operation (SARBAD).

Each of the outputs 294, 296 and 302-308 are input to one of seven NAND gates 310 with the outputs 298 and 300 each input to one of two inputs on a NAND gate 312 through inverters 314 and 316, respectively. The output of NAND gate 312 is input to the last of the NAND gates 310. The other inputs of the NAND gate 310 are connected to the Master Enable signal ME such that the output of NAND gates 310 requires the presence of ME to generate the commands. However, the Masked Read signal MASKRD and the READNVB signal do not require gating by the Master Enable signal.

Each of the outputs of the NAND gates 310 are inverted through a bank of inverters 318, with the inverter 318 associated with output 308 providing the SARBAD signal, the inverter 318 associated with the output 306 providing the WNVR signal, the inverter 318 associated with the output 302 providing the RNVR signal, the output of inverter 318 associated with the output 296 providing the RCRCR signal and the inverter 318 associated with the output 294 providing the QARBBY signal. The output of the inverter 318 associated with the output of NAND gate 312 is input to one input of an OR gate 320, the other input of which is connected through an inverter 322 to the output of a NAND gate 324. The NAND gate 324 has one input thereof connected to the QARBBY output and the other input thereof connected through an inverter 326 to the Compressed Write Enable output (CWE). In a similar manner, the inverter 318 associated with the output 304 is input to one input of an OR gate 328, the other input of which is connected to the output of an AND gate 330. The AND gate 330 has one input thereof connected to the QARBBY signal and the other input thereof connected to the CWE signal. The output of OR gate 320 provides the normal Read signal NR and the output of the OR gate 328 provides the normal Write signal NW. The logic functions for the signals in the various control fields are illustrated in Table I as a function of the five-bit control field C0-C4.

TABLE I

| COMMAND | LOGIC FUNCTION |
| --- | --- |
| SARBAD | WRITE*10110*ME |
| WNVR | WRITE*01110*ME |
| NW | WRITE*10001*ME or CWE*QARBBY |
| RNVR | READ*00101*ME |
| NR | READ*00110*ME or READ*11XXX*ME or CWE-BAR*QARBBY |
| RCRCR | READ*00011*ME |
| QARBBY | WRITE*01001*ME |
| READNVB | READ*00101 |
| MASKRD | READ*11XXX |

The signals CARTMAT and CRCMAT are input to one input of a three input AND gate 332, the output of which is connected to the D-input of a D-flip flop 334. The remaining input of the AND gate 332 is connected to the output of an eight-input OR gate 336. Each of the inputs of the OR gate 336 is connected to an associated one of the outputs 294-308 of the decode circuit 292. The OR gate 336 is operable to have the output thereof disposed at a logic high in the presence of at least one valid command. If at least one valid command is not present, the output of OR gate 336 is low and AND gate 332 will be inhibited such that the D-input to flip flop 334 is low. The clock input to the flip flop 334 is connected to the output of a NAND gate 338 and the clock-bar input is connected to the output of NAND gate 338 through inverter 340. The NAND gate 338 is connected on one input through an inverter 342 to the DELCLK signal and the other input thereof is connected to the RSTB signal and also connected to the reset input of the flip flop 334. In operation, when the input signals CARTMAT and CRCMAT are valid and a valid command is present in the control field, the Master Enable signal is generated on the rising edge of the DELCLK signal after the appropriate command is generated. It is important to note that the READNVB and MASKRD signals are generated prior to generation of the ME signal. In addition, the first three bits C∅–C2 are output to the cartridge select block 134.

Address Field Block

Figure 10:
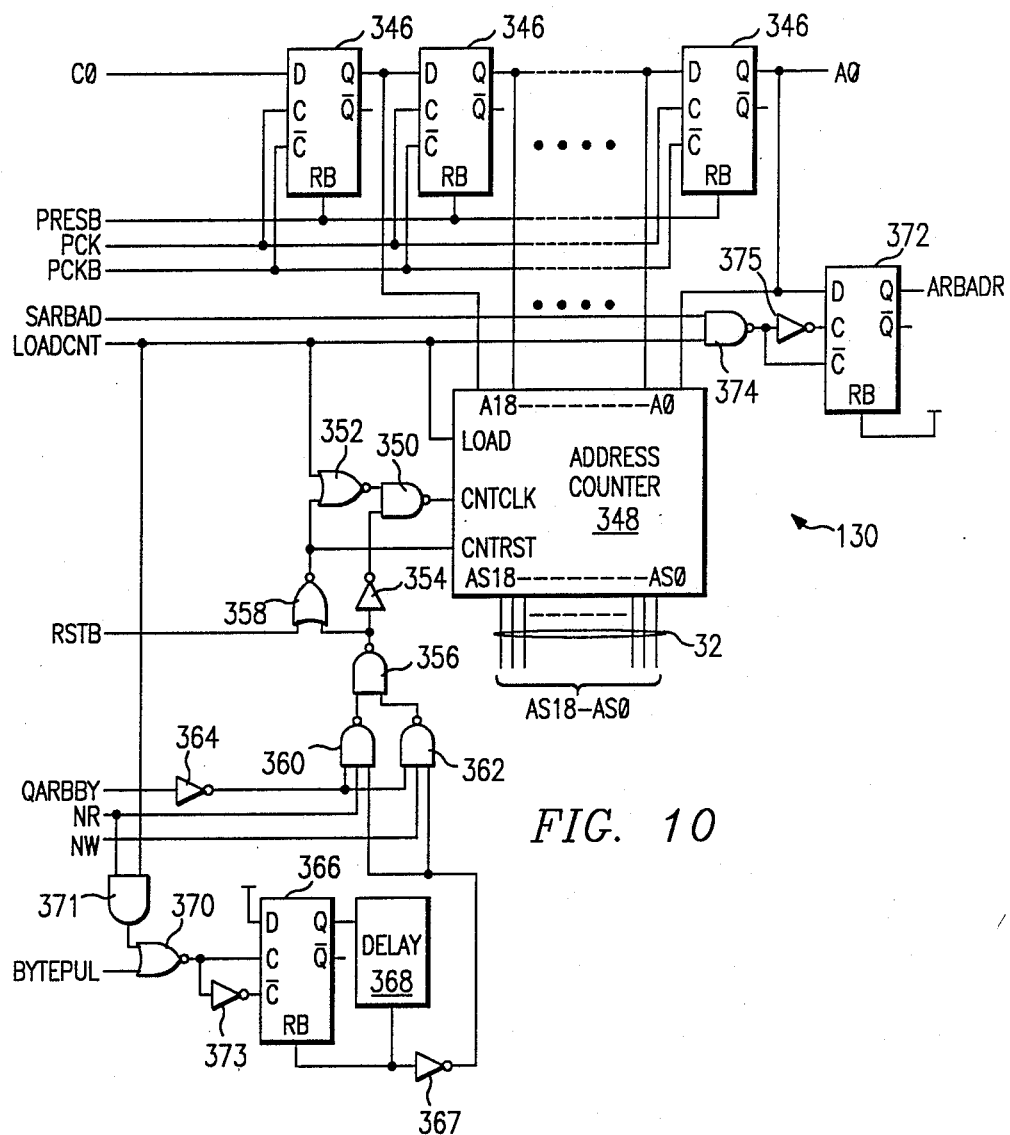
FIG. 10 illustrates a logic diagram of the address field block.

Referring now to FIG. 10, there is illustrated a logic diagram of the address field block 130. Generally, the address field is shifted in and stored in a nineteen-bit shift register. The shift register is comprised of nineteen D-type flip flops 346. Each of the flip flops 346 in the shift register has the D-input thereof connected to the Q-output of the preceding one of the flip flops with the last of the flip flops 346 in the shift register having the Q-output thereof connected to the A∅ output and the first of the flip flops 346 in the shift register having the D-input thereof connected to the C∅ input. The clock inputs of all of the flip flops 346 are connected to the PCK signal and the clock-bar inputs are connected to the PCKB signal. The reset input is connected to the PRESB signal.

The outputs of the flip flops 346 provide the address signals A∅–A18, which are input to the parallel input of a sequential address counter 348. The address counter 348 has a load input connected to the LOADCNT input to load the value of the nineteen bit shift register therein for output on the bus 32. After loading, a signal is input to a count input CNTCLK for incrementing the counter 348. The CNTCLK input is connected to the output of a NAND gate 350, one input of which is connected to the output of a NOR gate 352 and the other of which is connected through an inverter 354 to the output of a NAND gate 356. The reset input RSTB is connected through a two-input NOR gate 358 to the CNTRST input for the reset operation in the counter 348, the other input of NOR gate 358 being connected to the output of the NAND gate 356. The NOR gate 352 has one input thereof connected to the reset input on the counter 348 and the other input thereof connected to the LOADCNT signal. The NOR gate 352 and NAND gate 350 operate to force the CNTCLK input to a "1" for a reset or load operation.

The NAND gate 356 has one input thereof connected to the output of a three-input NAND gate 360 and the other input thereof connected to the output of a three input NAND gate 362. One input of each of NAND gates 360 and 362 is connected through an inverter 364 to the QARBBY input. One input of NAND gate 360 is connected to the NR signal and one input of NAND gate 362 is connected to the NW signal. One input of NAND gate 360 and one input of NAND gate 362 are connected together and to the output of delay element 368 through inverter 367. The Q-output of flip flop 366 is connected to the reset input of the flip flop 366 and to the input of inverter 367 through delay element 368 and the D-input thereof is connected to the positive power supply voltage. The clock input is connected to the output of a NOR gate 370, and the clock-bar input is connected to NOR gate 370 through inverter 373. One input of NOR gate 370 is connected to the BYTEPUL signal and the other input is connected to the output of an AND gate 371, one input of which is connected to NR and the other of which is connected to the LOADCNT signal. Therefore, the LOADCNT signal in the presence of the NR signal during a Read operation and the BYTEPUL signal operate to clock the flip flop 366. As described above, this allows the initial address loaded into the counter 348 on a Read operation to be output to the RAM 12 immediately after loading of the protocol word. Accessed data is then loaded into the eight-bit shift register 122. It is necessary to use the LOADCNT signal since the BYTEPUL signal does not occur until after the first full byte has occurred. The flip flop 366 outputs a pulse that has a duration equal to the delay provided by delay element 368, this pulse being delayed through inverter 367 for input to the NAND gates 360 and 362 to clock the address counter 348, depending on the state of the NR, NW and QARBBY signals.

The arbitration address signal ARBADR is provided from the output of a D-type flip flop 372, the D-input of which is connected to the A∅ address and the clock input of which is connected through an inverter 375 to the output of a NAND gate 374. NAND gate 374 has one input thereof connected to the LOADCNT input and the other input thereof connected to the SARBAD input. The reset input of flip flop 372 is connected to the positive supply. Therefore, when the SARBAD signal is present from the control field block 132, the logic state of the A∅ address in the address field is clocked through to the Q-output of flip flop 372.

Function Field Block

Figure 11:
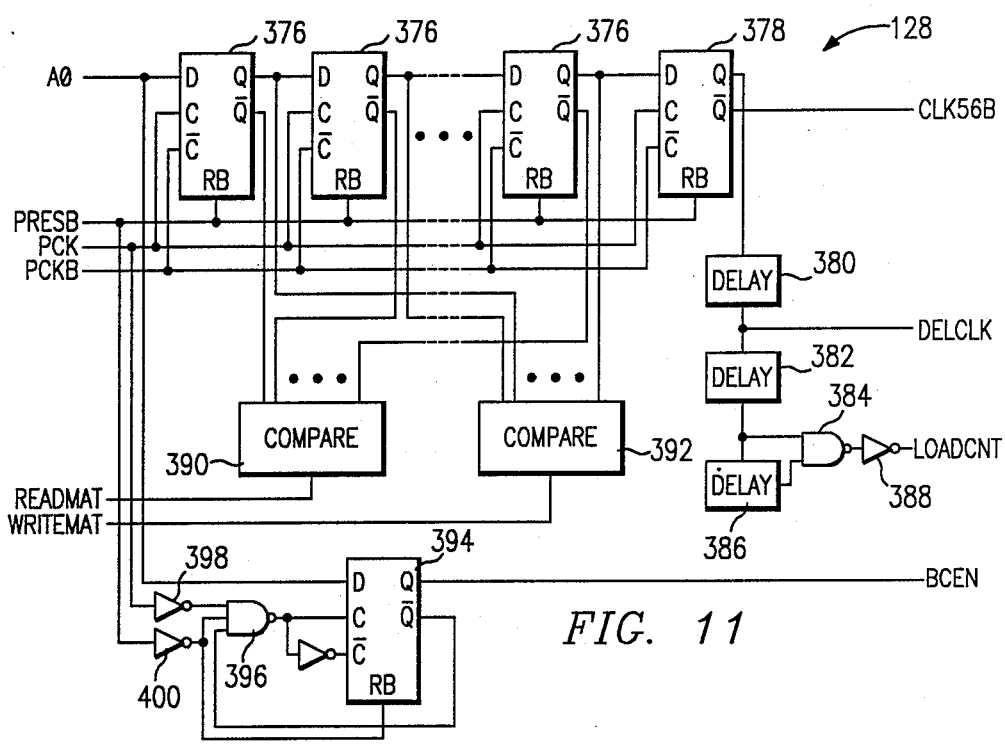
FIG. 11 illustrates a logic diagram of the function field block.

Referring now to FIG. 11, there is illustrated a logic diagram of the function field block 128. As described above, the function field is eight bits wide and is stored in an eight-bit shift register. The eight-bit shift register is comprised of eight D-type flip flops 376. Flip flops 376 have the D-input thereof connected to the Q-output of the previous flip flop with the input of the first flip flop 376 in the shift register being connected to the A∅ input and the output of the last of the flip flops 376 having the Q-output connected to the D-input of a D-type flip flop 378. The clock inputs of flip flops 376 and flip flop 378 are connected to the PCK input with the clock-bar inputs thereof connected to the PCKB input. All of the reset inputs of flip flops 376 and the flip flop 378 are connected to the PRESB signal.

The Q-output of flip flop 378 is connected to the input of a delay circuit 380, the output of which comprises the delay clock signal (DELCLK). The DELCLK signal is also input through a second delay 382, the output of which is input to one input of a NAND gate 384, the other input of which is connected to the output of delay clock 382 through another delay 386 which also inverts the logic state, delay 386 providing a pulse output from NAND gate 384 which is input to an inverter 388 to provide the LOADCNT signal on the output thereof. The Q-bar output of flip flop 378 provides a CLK56B output. As described above, there is always a logic "1" bit that precedes the data shifted into the protocol shift register. When this bit enters the D-flip flop 378, the Q-output goes high and the Q-bar output goes low. The delay clock (DELCLK) signal is generated after the delay of delay 380 with the LOADCNT signal generated after a predetermined amount of time determined by the delay 382.

The Q- and Q-bar outputs of the flip flops 376 are selectively input to either a compare circuit 390 or a compare circuit 392. When all of the bits that are input to either the compare circuit 390 or the compare circuit 392 are a logic "1", the respective output thereof is high. The output of the compare circuit 390 comprises the Read Match signal READMAT and the output of the compare circuit 392 comprises the Write Match signal WRITEMAT.

The BCEN signal is generated on the output of a flip flop 394, the D-input of which is connected to the AØ input. The clock input of flip flop 394 is connected through a three-input NAND gate 396 which has one input thereof connected through an inverter 398 to the PCK signal, one input thereof connected through an inverter 400 to the PRESB signal and the other input of which is connected to the Q-bar output of flip flop 394. The output of inverter 400 is also connected to the reset input of flip flop 394. Flip flop 394 is operable to generate the BCEN signal on the rising edge of the PCK signal when AØ is equal to "1" after being reset by the global preset signal PRESB. This is the forty-eighth rising edge after the reset signal goes high which is one byte before shifting in of the last of the fifty-six protocol bits.

Eight-Bit Shift Register

Figure 12:
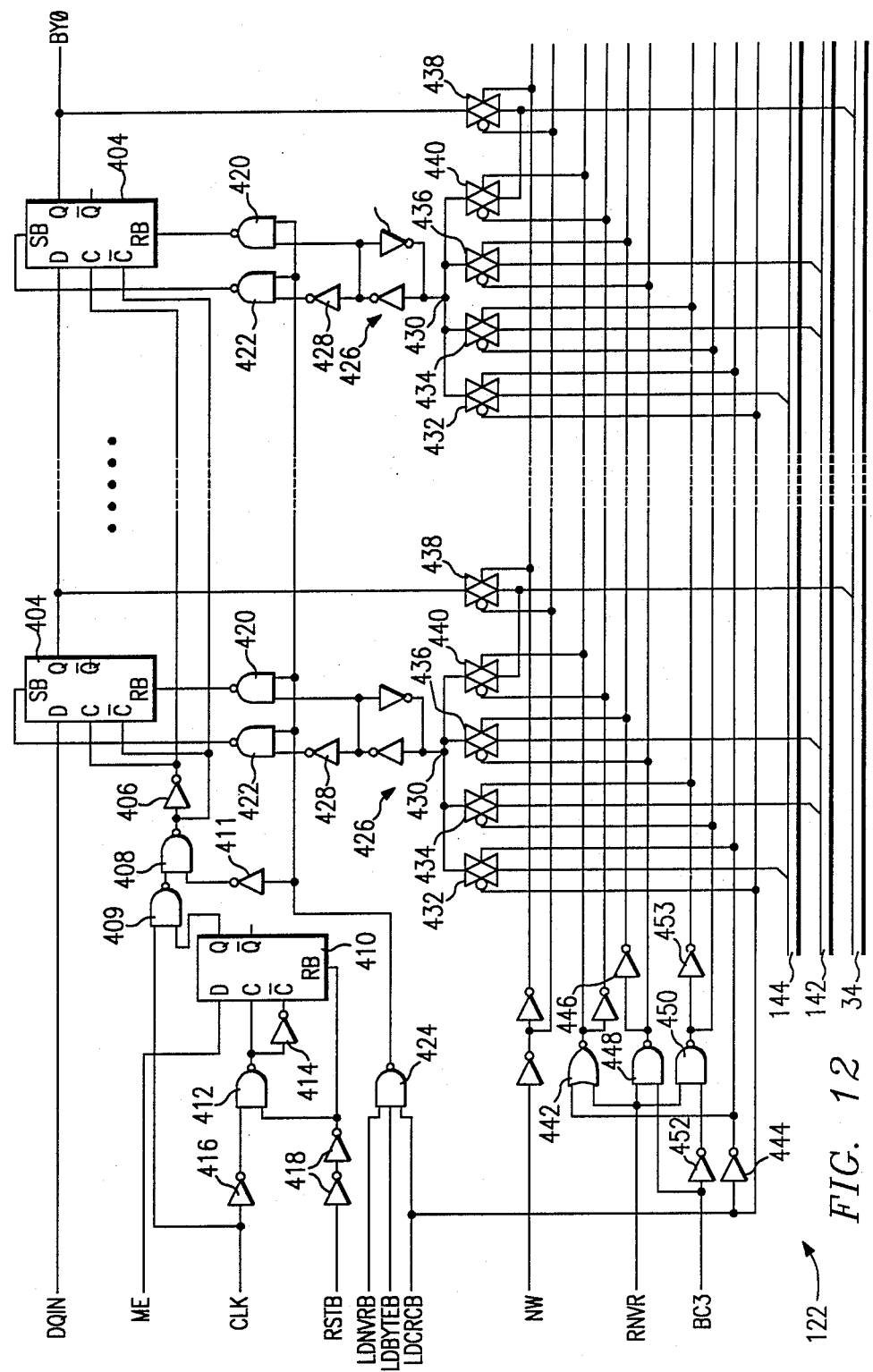
FIG. 12 illustrates a logic diagram of the eight-bit shift register.

Referring now to FIG. 12, there is illustrated a logic diagram of the eight-bit shift register 122. Shift register 122 is generally comprised of eight D-type flip flops 404 connected as a serial shift register with the D-input of each of the flip flops 404 connected to the Q-output of the previous flip flop 404. The D-input of the first flip flop 404 in the shift register is connected to the DQIN input and the Q-output of the last flip flop 404 in the shift register is connected to the BYØ output. The clock inputs of flip flops 404 are connected through an inverter 406 to the output of a two-input AND gate 408 and the clock-bar inputs are connected to the output of the AND gate 408. One input of AND gate 408 is connected to the output of a two-input NAND gate 409, and the other input of which is connected to the output of an inverter 411, the input of which is connected to the signal LOADSR2. The NAND gate 409 has one input thereof connected to the Q-output of a flip flop 410 and the other input thereof connected to the CLK signal. The flip flop 410 has the D-input thereof connected to the Master Enable signal ME and the clock inputs thereof connected to the output of a NAND gate 412 with an inverter 414 inverting the output of NAND gate 412 for input to the clock-bar input. NAND gate 412 has one input thereof connected through an inverter 416 to the CLK signal and the other input thereof connected through two series connected inverters 418 to the RSTB input. Flip flop 410 is operable to clock through the ME signal and latch it on the Q-output of flip flop 410 on the edge of the CLK signal such that no shifting occurs until the ME signal is present. Thereafter, the CLK signal clocks the flip flops 404.

Each of the flip flops 404 has the reset input connected to the output of a two-input NAND gate 420. The set input is connected to the output of a two-input NAND gate 422. One input of each of the NAND gates 420 and 422 is connected to the output of a three-input NAND gate 424 which comprises the LOADSR2 signal for loading the shift registers. One input of NAND gate 424 is connected to the LDNVRB input, one input thereof is connected o the LDBYTEB input and the other input is connected to the LDCRCB signal. When any one of these signals goes low, the LOADSR signal goes high to load the shift registers.

The other input of NAND gate 422 is connected to the output of a latch 426 through an inverter 428. Latch 426 is comprised of two inverters in a back-to-back configuration. The other input of NAND gate 420 is connected directly to the output of the latch 426. The input of latch 426 is connected to a node 430. Latch 426 is operable to store the data to be loaded into the shift register in response to the LOADSR signal going high.

Node 430 is connected through a transfer gate 432 to one line in the bus 144. The node 430 is also connected to two lines of the bus 144 through the transfer gates 434 and 436, respectively. As described above, during one half of a load operation, one of the lines NVØ–NV7 is loaded into the latch 426 and, during the second half of the load operation thereafter, the associated one of the lines NV8–NV15 is loaded into the latch 426. For example, the first flip flop 404 connected to DQIN illustrated in FIG. 10 comprises the MSB of the shift register. Therefore, on the first operation, the signal on output line NV7 would be loaded into the latch 426 and, thereafter, the signal on output line NV15 would be stored in the latch 426. The associated data line from bus 34 is connected to the Q-output of flip flop 404 through a transfer gate 438 to allow writing thereof and also through a transfer gate 440 to allow reading thereof and storage in the latch 426. The transfer gate 432 is controlled by the LDCRCB input representing the loading operation for the CRC register 136. The transfer gate 440 is controlled to load the latch 426 by the LDRAM signal on the output of a two-input NOR gate 442. NOR gate 442 has one input thereof connected through an inverter 444 to the LDCRCB input and the other input thereof connected to the RNVR input. The transfer gate 440 transfers data to the latch 426 when the LDRAM signal is high and when both inputs of NOR gate 442 are low. The transfer gate 438 is controlled by the NW input.

The two transfer gates 434 and 436 are controlled to sequentially write the lower half and upper half of the sixteen-bit nonvolatile portion of the cartridge select block 134. The eight least significant bits are input to transfer gate 436 and are transferred to latch 426 when the signal LDNVRL is high, which signal is connected through an inverter 446 to the output of a NAND gate 448. NAND gate 448 is connected to the RNVR input and the other input thereof is connected to the BC3 input. Therefore, when both the RNVR signal and the BC3 signal are high, transfer gate 436 is operable to transfer information. The upper half of the sixteen-bit nonvolatile register in the cartridge select block 134 is transferred to latch 426 by transfer gate 434 by the LDNVRM signal. This signal is output from a NAND gate 450 through an inverter 453. One input of NAND gate 450 is connected through an inverter 452 to the BC3 input and the other input thereof is connected to the RNVR signal When RNVR is high and BC3 is low, the upper half of the non-volatile register in the cartridge select block 134 is transferred to the shift register 122.

Four Bit Counter

Figure 13:
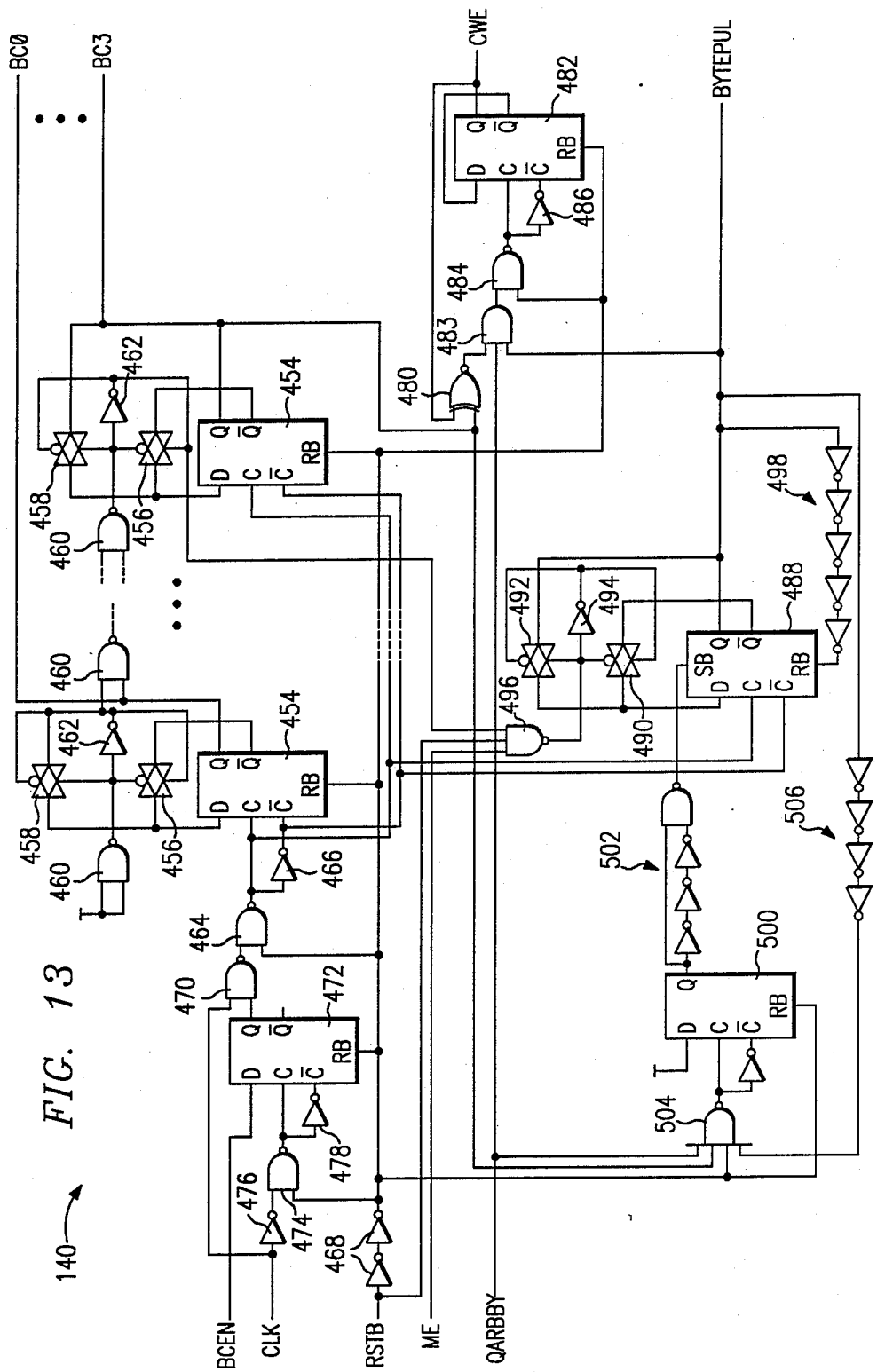
FIG. 13 illustrates a logic diagram of the four-bit byte counter.

Referring now to FIG. 13, there is illustrated a logic diagram of the four-bit counter 140. The four-bit counter is comprised basically of four D-type flip flops 454 arranged in a four-bit counter configuration. The Q-bar output of each of the flip flops 454 is connected to the D-input thereof through a transfer gate 456 and the Q-output thereof is connected to the D-input thereof through a transfer gate 458. A NAND gate 460 is provided having the output thereof connected to the input of an inverter 462 and also connected to the control input of the transfer gate 458, such that the transfer gate 458 connects the Q-output to the D-input when the output of the NAND gate 460 is at a logic high and the output of inverter 462 is low. The output of the inverter 462 is connected to the control input of the transfer gate 456 such that when the output of inverter 462 is a logic high, the Q-bar output of flip flop 454 is connected to the D-input thereof. The output of inverter 462 is connected to one input of the NAND gate 460 associated with the next sequential flip flop 454 in the counter. For the first bit in the counter, the two inputs of the NAND gate 460 associated therewith are connected to a positive supply such that the output of inverter 462 is a logic high and the Q-bar output thereof is always connected to the D-input. The Q-output therefore comprises the BC0 output.

In operation, when the Q-outputs of all preceding flip flops 454 go high, the output of NAND gate 460 goes low to connect the Q-bar output of the next of the flip flops 454 for the next bit to the D-input thereof. The outputs BC0-BC3 provide a count value to determine the end of each byte on the serial port which coincides to the transfer of data to and from the RAM 12, during an access window.

Each of the flip flops 454 have the clock inputs thereof connected to the output of a NAND gate 464 with the clock-bar inputs thereof connected to the output of NAND gate 454 through inverter 466. The reset inputs of flip flops 454 and one input of NAND gate 464 are connected to the RSTB input through two series-connected inverters 468. The other input of NAND gate 464 is connected to the output of a NAND gate 470. NAND gate 470 has one input thereof connected to the Q-output of a flip flop 472 and the other input thereof connected to the CLK signal. Flip flop 472 has the D-input thereof connected to the BCEN signal and the clock input thereof is connected to the output of a NAND gate 474. One input of NAND gate 474 is connected to the CLK signal through an inverter 476 and the other input thereof is connected to the reset input RSTB through inverters 468. The reset input of flip flop 472 is also connected to the reset output of inverters 468. The clock-bar input of flip flop 472 is connected to the output of NAND gate 474 through an inverter 478.

In operation, the NAND gate 470 inhibits operation of the counter until generation of the enable signal BCEN. As described above, the enable signal BCEN is generated one byte prior to the entire fifty-six bit protocol field being loaded into the protocol shift register. This provides the count value BC0-BC3 on the output of the four-bit counter 140 prior to the transfer of any data from RAM 12 on the serial data link 18. As described above, this is important in an initial Read operation, since data transfer will occur immediately after loading of the protocol word during the first access window. Therefore, the parallel CPU operating in the interleaved mode can examine the count bits C0-C2 in the first field 51 of the arbitration byte 38 to determine if the serial CPU 28 has access to the system. Tis allows the parallel CPU 24 to make a determination as to when the system is free for access and thus minimizes the possibility of a collision even on the first access by the serial CPU 28.

The BC3 output of the counter is input to one input of an Exclusive NOR gate 480, the other input thereof connected to the Q-output of a flip flop 482. The output of Exclusive NOR gate 480 is connected to one input of a three-input AND gate 483, an other input of which is connected to the signal QARBBY and the third input of which is connected to the output BYTEPUL. The output of the AND gate 483 is connected to one input of a NAND gate 484, the other input of which is connected to the reset input RSTB through inverters 468. The output of NAND gate 484 provides the clock input for flip flop 482 and the clock-bar input through inverter 486. Flip flop 482 has the D-input thereof connected to the Q-bar output and the Q-output provides the Compressed Write Enable signal CWE.

The BYTEPUL signal is generated on the output of a flip flop 488 which is configured similar to the flip flops 454. A transfer gate 490 corresponds to transfer gate 456, a transfer gate 492 corresponds to transfer gate 458 and an inverter 494 corresponds to inverter 462. A three-input NAND gate 496 is provided that corresponds to NAND gate 460. Gate 496 is utilized to prevent the BYTEPUL signal from being generated at the time the CLK56B signal goes low or on a serial reset. The clock and clock-bar inputs of flip flop 488 are connected to the clock and clock-bar inputs, respectively, of flip flops 454, and the reset input of flip flop 488 is connected to the BYTEPUL output through five series-connected inverters 498 to provide a time delay. The NAND gate 496 has one input thereof connected to the Master Enable signal ME and the other input thereof connected to the output of the inverter 462 on the flip flop 454 associated with the BC3 output. Therefore, when BC0, BC1, BC2, ME and RST are high, the output of inverter 494 goes high and transfers the Q-bar output to the D-input thereof and the BYTEPUL output goes high at the receipt of the next rising edge of the clock on the flip flop 488 for a predetermined amount of time determined by the inverters 498. This signal which is a pulse indicates the end of a byte which is utilized by the control signal block 138 for output of control signals, and by the address field block 130 to increment the internal counter 348.

The flip flop 488 has the set input thereof connected to the Q-output of a flip flop 500 through a pulse circuit 502. The D-input of flip flop 500 is connected to the positive voltage supply and the clock inputs are connected to the output of a four-input NAND gate 504 which has one input thereof connected to the QARBBY input, one input thereof connected to the BC3 output, one input thereof connected to the reset signal through inverters 468 and the other input thereof connected to the BYTEPUL signal through a delay circuit 506. This circuit creates a second BYTEPUL pulse off of one rising clock edge in a query arbitration byte access.

Control Mux

Figure 14:
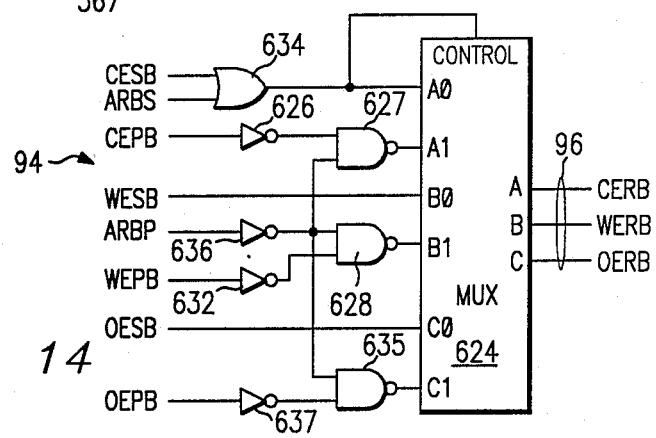
FIG. 14 illustrates a logic diagram of the control multiplexer.

Referring now to FIG. 14, there is illustrated a logic diagram of the control multiplexer 94 of FIG. 3. The multiplexer 94 is comprised of a multiplexer 624 operable to have three pairs of inputs for being connected to an associated one of three outputs on lines 96. The multiplexer is controlled by the CESB input such that whenever a Chip Enable for the serial port is present and the arbitration byte is not being accessed from the serial port, the control signals for the serial port are selected and, when the Chip Enable signal for the serial port is not present or the serial port is accessing the arbitration byte, the control signals for the parallel port are selected. Two inputs on the A0 and A1 inputs comprise the CESB and CEPB inputs, which are selected for connection to the CERB output. The CESB input is connected to one input of an OR gate 634, the other input of which is connected to the ARBS signal and the output connected to the A0 input. The OESB signal is input to multiplexer 624 on the C0 input and the OEPB signal is input to one input of a NAND gate 635 through an inverter 637, the output of NAND gate 635 connected to the C1 input. The other input of NAND gate 635 is connected to the output of inverter 636. The Write Enable signal WEPB is input to a NAND gate 628 through inverter 632. The other input of NAND gate 628 connected to the ARBP input through an inverter 636. The output of the two input NAND gate 628 is input to the multiplexer 624 on input B1. The WESB input is connected to the B0 input. Therefore, the only time the RAM control signals CERB, WERB, and OERB will be driven by the serial port is when CESB is a "0" and ARBS is a "0". If CESB is a "1" and ARBP is a "0" the RAM control signals CERB, WERB and OERB will be driven by the parallel port.

Although the preferred embodiment has been described in detail, it should be understood that various changes, substitutions and alterations can be made therein without departing from the spirit and scope of the invention as defined by the appended claims.

What is claimed is:

1. Access circuitry associated with a peripheral device for selectively gaining access thereto from the common data link, comprising:
    interface means for interfacing with the common data link for receiving ID information and control information from a common data link and transferring data between the common data link and the peripheral unit;
    protocol means for receiving and storing control information and ID information received from the common data link;
    ID storage means for storing a digital ID template corresponding to the ID information;
    data transfer means for transferring data between said interface means and the peripheral device;
    masking means for masking off a portion of said ID template in response to receiving a predetermined mask command in the control information, said predetermined mask command determining the portion of said ID template that is masked off;
    compare means for comparing the unmasked portion of said ID template with the corresponding portion of the received ID information stored in said protocol means and outputting a match signal if a match is present between the unmasked portion of said ID template and the corresponding portion of the received ID information stored in said protocol means;
    control means for controlling said data transfer means to transfer data to the peripheral device from said interface means in response to device Write control information stored in said protocol means, or from the peripheral device to said interface means in response to device Read control information stored in said protocol means;
    inhibit means for inhibiting access to the peripheral unit by said data transfer means if a match signal is not generated by said compare means.

2. The access circuitry of claim 1 wherein said ID template comprises a digital word of a predetermined bit length and the received ID information comprises a digital word equal in length to said ID template.

3. The access circuitry of claim 2 wherein said compare means comprises:
    a plurality of comparator circuits, each comparator circuit associated with each of the bits in said ID template and operable to compare the associated data bit in said ID template with a corresponding data bit in said received ID information;
    output circuitry for outputting said match signal if all of the outputs of said comparator circuits indicate a match; and
    means for selectively forcing the output of said compare circuits to a match condition in response to said compare circuits being associated with masked data bits in said ID template.

4. The access circuitry of claim 3 wherein said predetermined mask command contains coded information for a predetermined number of bits in said ID template that are to be masked off wherein said masking means comprises:
    a decoder for decoding the coded information in said mask command; and
    decoder output circuitry for interfacing with each of said compare circuits and operable to control said compare circuits to provide a match condition on the output thereof in accordance with the decoded information from said decoder.

5. The access circuitry of claim 1 wherein said predetermined mask command has associated therewith device Read control information such that said control means controls said data transfer means to transfer data from the peripheral device to said interface means in response to the presence of said mask command stored in said protocol means and the presence of said match signal.

6. The access circuitry of claim 2 wherein said masking means is operable to mask off a predetermined number of adjacent pairs of data bits in said ID template.

7. The access circuitry of claim 1 wherein the common data link is a serial data link.

8. The access circuitry of claim 7 wherein said data transfer means comprises:
    shift register means for receiving serial data from said interface means and converting it to parallel data for a Write operation, for transfer to the peripheral unit and for receiving parallel data and converting it to serial data for a Read operation for transfer to said interface means;
    first gating means for transferring parallel data between said shift register means and the peripheral unit;
    second gating means for transferring parallel data from said ID storage means to said shift register means; and
    third gating means for transferring serial data from said serial means to said ID storage means;
    said control means controlling said first, second and third gating means in response to control information stored in said protocol means.

9. An ID protected access circuit for interfacing with a common data link, comprising:
    receive circuitry for receiving ID information and a mask command from the common data link;
    ID storage means for storing as an ID template a digital word of a predetermined bit length;
    mask means for masking off a portion of said ID template in accordance with information in said mask command;
    compare means for comparing the unmasked portion of said ID template with the corresponding portion of the received ID information and outputting a match signal if a match is present between the unmasked portion of said ID template and the corresponding portion of the received ID information; and means for outputting a response to the common data link in response to generation of said match signal.

10. The access circuit of claim 9 wherein said compare means comprises:
   a plurality of comparator circuits, each comparator circuit associated with each of the bits in said ID template and operable to compare the associated data bit in said ID template with a corresponding data bit in said received ID information;
   output circuitry for outputting said match signal if all of the outputs of said comparator circuits indicate a match; and
   means for selectively forcing the output of the ones of said compare circuits associated with masked data bits in said ID template to a match condition.

11. The access circuit of claim 10 wherein: said mask command contains coded information for a predetermined number of bits in said ID template that are to be masked off;
   said mask means comprising a decoder for decoding the coded information in said mask command; and
   said means for selectively forcing the output of said comparator circuits to a match condition comprising circuitry for interfacing with each of said compare circuits and operable to control said compare circuits to provide a match condition on the output thereof in accordance with the decoded information from said decoder circuit.

12. The access circuit of claim 9 wherein said mask means is operable to mask off a group of adjacent pairs of data bits in said ID template.

13. The access circuit of claim 9 wherein the access circuit interfaces with a peripheral memory unit and said means for outputting a response comprises:
   means for generating a read control signal in response to receiving said mask command; and
   means for accessing a predetermined storage location in said memory in response to generation of said match signal and outputting data therefrom to the common data link in response to generation of said read control signal.

14. A method for accessing an ID protected access circuit that interfaces with a common data link, comprising:
   receiving ID information from the common data link;
   receiving a mask command from the common data link;
   prestoring as an ID template a digital word of a predetermined bit length;
   masking off a portion of the ID template in accordance with information in the mask command;
   comparing the unmasked portion of the ID template with the corresponding portion of the ID information and outputting a match signal if a match is present between the unmasked portion of the ID template and the corresponding portion of the received ID information; and
   outputting a response to the common data link in response to generation of the match signal.

15. The method of claim 14 wherein the step of comparing comprises:
   comparing the associated data bit in the ID template with the corresponding data bit in the received ID information;
   outputting the match signal if a valid comparison is found between all of the bits in the ID template and the corresponding bits in the received ID information; and
   selectively forcing a match condition between the masked data bits in the ID template and the associated bits in the received ID information.

16. The method of claim 14 wherein
   the mask command contains coded information for a predetermined number of bits in the ID template that are to be masked off;
   the step of masking comprising decoding the coded information in the mask command; and
   the step of forcing a matched output with the masked data bits in the ID template comprising the step of providing a match condition between the bits of the ID template and the received ID information in accordance with the decoded information from the mask command.

17. The method of claim 14 wherein the step of outputting a response comprises:
   addressing a memory location in a random access memory to access a predetermined memory location therein;
   generating a read control signal for the random access memory in response to receiving the mask command; and
   outputting the contents of the addressed memory location to the common data link in response to generation of the read control signal.

* * * * *